United States Patent [19]
Winters

[11] Patent Number: 5,063,522
[45] Date of Patent: Nov. 5, 1991

[54] MULTI-USER, ARTIFICIAL INTELLIGENT EXPERT SYSTEM

[75] Inventor: Ralph A. Winters, Sherman Oaks, Calif.

[73] Assignee: Intellisystems, Inc., Chatsworth, Calif.

[21] Appl. No.: 551,764

[22] Filed: Jul. 10, 1990

Related U.S. Application Data

[63] Continuation of Ser. No. 168,253, Mar. 15, 1988, abandoned.

[51] Int. Cl.$^5$ .............................................. G06F 15/18
[52] U.S. Cl. .......................................... 395/51; 395/54; 395/11; 395/200; 395/275
[58] Field of Search ............... 364/513, 200 MS File, 364/900 MS File

[56] References Cited

U.S. PATENT DOCUMENTS

| | | | |
|---|---|---|---|
| 3,903,509 | 9/1975 | Picadent | 364/900 |
| 4,365,315 | 12/1982 | Jamnik | 364/900 |
| 4,371,752 | 2/1983 | Matthews | 379/89 |
| 4,447,874 | 5/1984 | Bradley | 364/200 |
| 4,540,855 | 9/1985 | Szlam | 379/377 |
| 4,553,202 | 11/1985 | Trufyn | 364/200 |
| 4,580,012 | 4/1986 | Matthews | 379/245 |
| 4,580,016 | 4/1986 | Williamson | 379/31 |
| 4,581,486 | 4/1986 | Matthews | 379/88 |
| 4,585,906 | 4/1986 | Matthews | 379/88 |
| 4,602,129 | 7/1986 | Matthews | 379/88 |
| 4,636,947 | 1/1987 | Ward | 364/200 |
| 4,640,991 | 2/1987 | Matthews | 379/88 |
| 4,642,756 | 2/1987 | Sherrod | 364/200 |
| 4,652,700 | 3/1987 | Matthews | 379/89 |
| 4,658,351 | 4/1987 | Teng | 364/200 |
| 4,658,370 | 4/1987 | Erman | 364/513 |
| 4,696,028 | 9/1987 | Morganstein | 379/88 |
| 4,783,752 | 11/1988 | Kaplan | 364/513 |

OTHER PUBLICATIONS

M. Morris Mano, "Computer System Architecture", 1976, pp. 226-227.

*Primary Examiner*—Joseph Ruggiero
*Attorney, Agent, or Firm*—Irell & Manella

[57] ABSTRACT

An artificial intelligent expert system design that integrates multi-tasking capabilities to allow more than one user to interface with a rule or knowledge base at one time without the need for adding additional hardware for each instance of use, or the need to load multiple rule base information for each user. In addition, the system can carry on interactive sessions with users while, at the same time, supporting sessions with the main system keyboard and screen. Additional provisions may be provided to allow information to be delivered to users in more than one language, further broadening the applicational use of the expert system. All users share a common rule base of knowledge, and when they interact with the system, their answers are segregated from each other, along with unique data information. The inference engine, being multi-tasking, manages all users positions within the rule base and coordinates data management between the users and the rule base. A multi-tasking system routine allocates system resources evenly to all users, allowing for a smooth degradation-free operation.

16 Claims, 28 Drawing Sheets

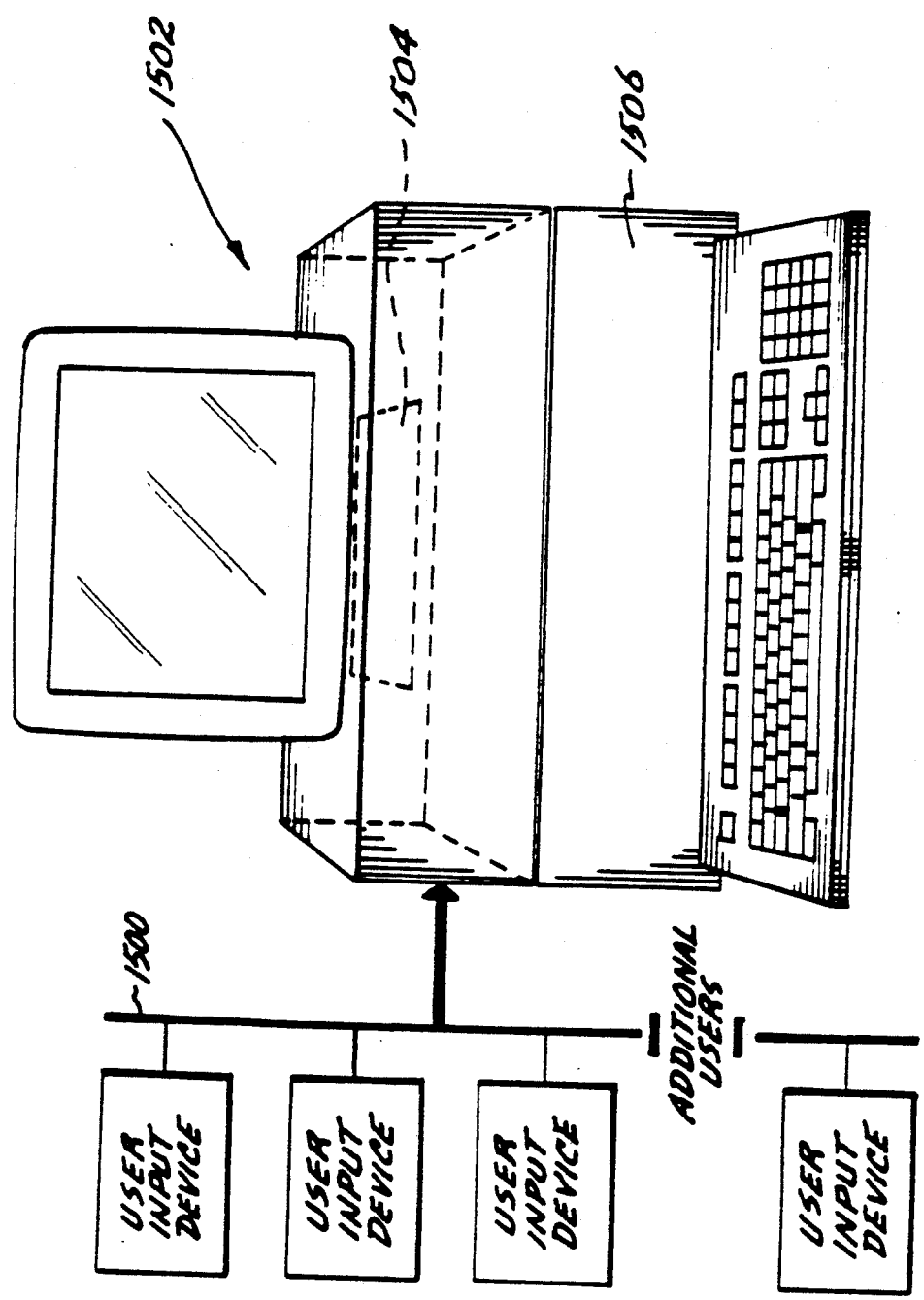

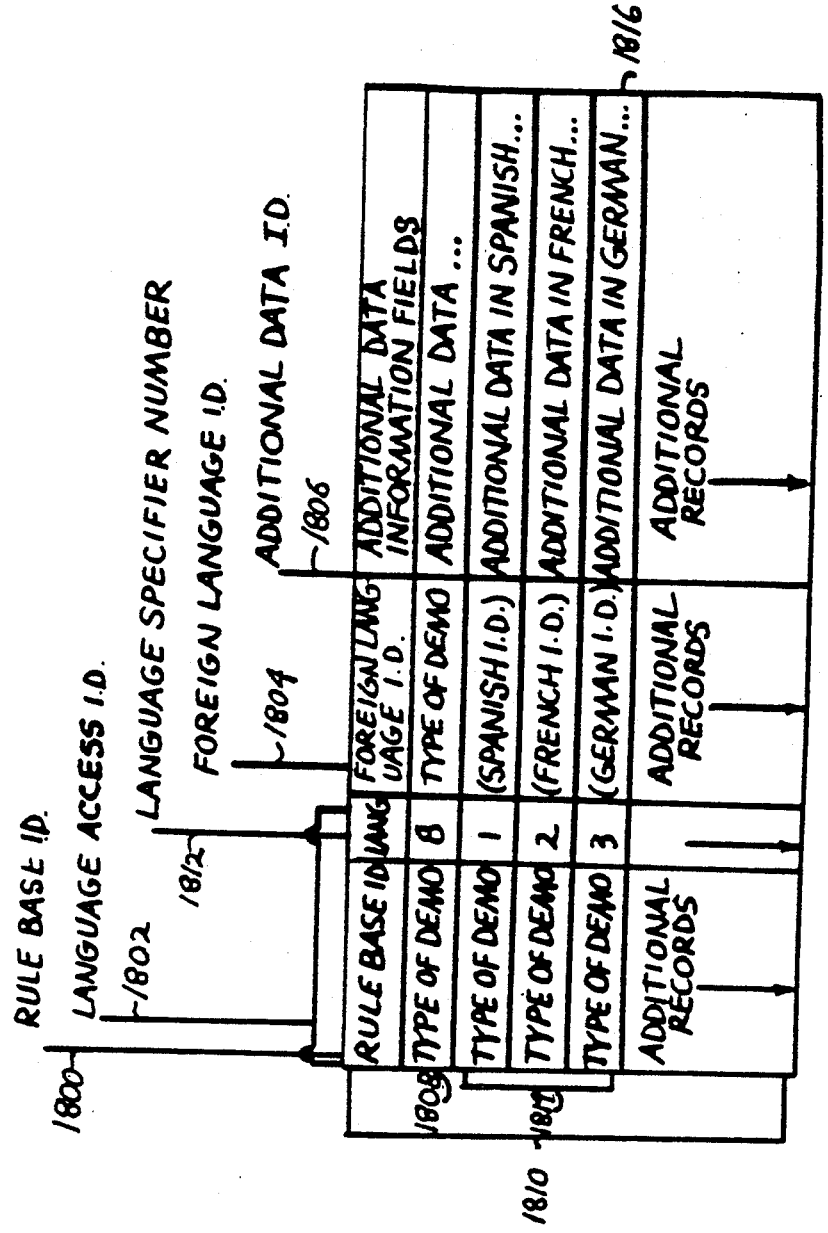

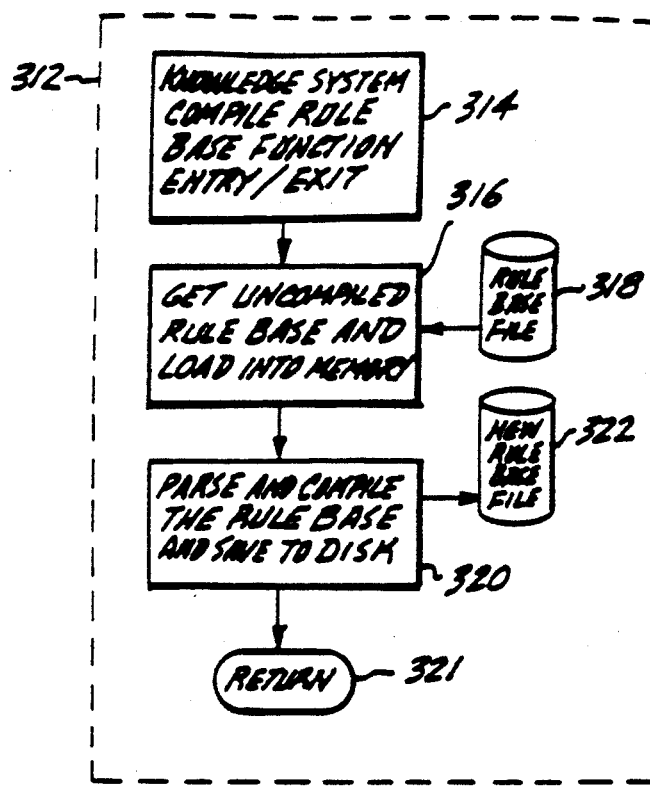

```
6
RULE PROD();
{;
    CHECK (TYPE OF DEMO) = INT(1);
    PROD (CABLE);
};
RULE PROD();
{;
    CHECK (TYPE OF DEMO) = INT(2);
    PROD (HARD DISK BOARD);
};
RULE PROD (CABLE);
{;
    CHECK (FAILURE TIME) = INT(1);
    CHECK (TYPE OF PROBLEM) = INT(1);
    CAUSE();
};
RULE PROD (CABLE);
{;
    CHECK (FAILURE TIME) = INT(1);
    CHECK (TYPE OF PROBLEM) = INT(1);
    CHECK (WALL POWER) = FALSE;
    CHECK (WALL SWITCH) = TRUE;
    CAUSE (WALL SWITCH OFF);
};
RULE PROD (CABLE);
{;
    CHECK (FAILURE TIME) = INT(1);
    CHECK (TYPE OF PROBLEM) = INT(1);
    CHECK (WALL POWER) = TRUE;
    CAUSE (WALL POWER);
};
RULE PROD (HARD DISK BOARD);
{;
    CHECK (FAILURE TIME);
    CAUSE (NO INSTALL);
};
```

```
6
RULE PROD()
1
        CHECK (TYPE OF DEMO) = INT(1)
        PROD (CABLE)
};
RULE PROD()
1
        CHECK (TYPE OF DEMO) = INT(2)
        PROD (HARD DISK BOARD)
};
RULE PROD(CABLE)
2
        CHECK(FAILURE TIME) = INT(1)
        CHECK(TYPE OF PROBLEM = INT(1)
        CAUSE()
}
RULE PROD (CABLE)
4
        CHECK (FAILURE TIME) = INT(1)
        CHECK (TYPE OF PROBLEM) = INT(1)
        CHECK (WALL POWER) = FALSE
        CHECK (WALL SWITCH) = TRUE
        CAUSE (WALL SWITCH OFF)
}
RULE PROD (CABLE)
3
        CHECK (FAILURE TIME) = INT(1)
        CHECK (TYPE OF PROBLEM) = INT(1)
        CHECK (WALL POWER) = TRUE
        CAUSE (WALL POWER)
}
RULE PROD(HARD DISK BOARD)
1
        CHECK (FAILURE TIME)
        CAUSE (NO INSTALL)
}
```

*Fig. 18.*

```
       ┌─ RULE PROD();
       │  {;
  1000 │      CHECK (TYPE OF DEMO) = INT(1); -1002
       │      PROD (CABLE);
       └─ };
       ┌─ RULE PROD();
       │  {;
  1007 │      CHECK (TYPE OF DEMO) = INT(2); - 1003
       │      PROD (HARD DISK BOARD) ———— 1004
       └─ };
          RULE PROD(CABLE); ———————————— 1001a
          {;
              CHECK(FAILURE TIME) = INT(1);
              CHECK (TYPE OF PROBLEM) = INT(1);
              CAUSE ();
          };
          RULE PROD(CABLE);
          {;
              CHECK (FAILURE TIME) = INT(1);
              CHECK (TYPE OF PROBLEM) = INT(1);
              CHECK (WALL POWER) = FALSE;
              CHECK (WALL SWITCH) = TRUE;
              CAUSE (WALL SWITCH OFF);
          };
          RULE PROD (CABLE);
          {;
              CHECK (FAILURE TIME) = INT(1);
              CHECK (TYPE OF PROBLEM) = INT(1);
              CHECK (WALL POWER) = TRUE;
              CAUSE (WALL POWER);
          };
       ┌─ RULE PROD (HARD DISK BOARD)
       │  {;
  1005 │      CHECK (FAILURE TIME) = INT(3); — 1006
       │      CAUSE (NO INSTALL); ———————— 1020
       └─ };
```

*Fig. 19.*

MULTI-TASKING, TWO USER FUNCTIONALITY TEST CHART PAGE 1

| | COL 1 | COL 2 | COL 3 | COL 4 | COL 5 | COL 6 | COL 7 |
|---|---|---|---|---|---|---|---|
| | ONE | USER | DESCRIPTION OF ACTION TAKEN | FUNCTION CALLED | REQUESTED ACTIONS | ON | DIAGRAM REFERENCE |
| 1 | RB | 1 | REQUEST BY USER 1 TO USE THE RULE BASE | LOAD RULE BASE | LOAD RULE BASE | RB | FIG. 7 |
| 2 | RB | 1 | SYSTEM CONTINUES TO LOAD RULE BASE IN PIECES SO OTHER MULTI-TASKING FUNCTION CAN BE SERVICED | LOAD RULE BASE | LOAD RULE BASE | RB | FIG. 7 |
| 3 | RB | 2 | REQUEST BY USER 2 TO USE THE RULE BASE | LOAD RULE BASE | INIT USER | RB | FIG. 7 |
| 4 | RB | 1 | SYSTEM FINISHES LOADING RULE BASE AND THEN REQUEST TO INITIALIZE THE USER | LOAD RULE BASE | INIT USER | RB | FIG. 7 |
| 5 | RB | 2 | INITIALIZE USER 2 | INIT USER | FIRE CURRENT RULE | RB | FIG. 8 |
| 6 | RB | 1 | INITIALIZE USER 1 | INIT USER | FIRE CURRENT RULE | RB | FIG. 8 |
| 7 | RB | 2 | GET THE CURRENT RULE INFORMATION FOR USER 2 | FIRE CURRENT RULE | REQUEST INPUT FROM USER 2 | AP | FIG. 9 |
| 8 | RB | 1 | GET THE CURRENT RULE INFORMATION FOR USER 1 | FIRE CURRENT RULE | REQUEST INPUT FROM USER 1 | AP | FIG. 9 |
| 9 | APP | 1 | DISPLAY CHECK QUESTION FOR USER 1 AND REQUEST ANSWER. | APPLICATION PROGRAM | NONE | | FIG. 3 (10) |
| 10 | APP | 2 | DISPLAY CHECK QUESTION FOR USER 2 AND REQUEST ANSWER. | APPLICATION PROGRAM | NONE | | FIG. 3 (10) |
| 11 | RB | 2 | PASS INPUT FROM USER 2 TO THE KNOWLEDGE BASE | GET INPUT | CONVERT INPUT | RB | FIG. 10 |
| 12 | RB | 2 | CONVERT INPUT AND REQUEST INPUT AGAIN BECAUSE IT WAS NOT WITHIN ALLOWABLE LIMITS | CONVERT INPUT | REQUEST INPUT FROM USER 2 | AP | FIG. 11 |
| 13 | RB | 1 | PASS INPUT FROM USER 1 TO THE KNOWLEDGE BASE | GET INPUT | CONVERT INPUT | RB | FIG. 10 |
| 14 | APP | 2 | DISPLAY CHECK QUESTION FOR USER 2 AND REQUEST ANSWER. | APPLICATION PROGRAM | NONE | | FIG. 3 (10) |
| 15 | RB | 1 | CONVERT INPUT AND REQUEST THAT THE RULE BE TESTED | CONVERT INPUT | TEST RULE | RB | FIG. 11 |

Fig. 23a.

MULTI-TASKING, TWO USER FUNCTIONALITY TEST CHART PAGE 2

| QUE | USER | DESCRIPTION OF ACTION TAKEN | FUNCTION CALLED | REQUESTED ACTIONS | QUE | DIAGRAM REFERENCE |
|---|---|---|---|---|---|---|
| 16 | RB | 1 | TEST THE RULE FOR USER 1. ANSWER PASSES BUT THERE ARE MORE QUESTIONS TO BE ASKED OF THE RULE | TEST RULE | FIRE CURRENT RULE | RB | FIG. 12 |
| 17 | RB | 2 | PASS INPUT FROM USER 2 TO THE KNOWLEDGE BASE | GET INPUT | CONVERT INPUT | RB | FIG. 10 |
| 18 | RB | 1 | GET NEXT QUESTION IN THE CURRENT RULE AND REQUEST ANSWER FROM USER 1 | FIRE CURRENT RULE | REQUEST INPUT FROM USER 1 | APP | FIG. 9 |
| 19 | RB | 2 | CONVERT INPUT & REQUEST THAT THE RULE BE TESTED | CONVERT INPUT | TEST RULE | RB | FIG. 11 |
| 20 | RB | 1 | DISPLAY CHECK QUESTION FOR USER 1 AND REQUEST ANSWER. USER TAKES LONG DELAY IN ANSWERING | APPLICATION PROGRAM | NONE | | FIG. 3 (18) |
| 21 | RB | 2 | TEST THE RULE FOR USER 2. ANSWER FAILS SO REQUEST THAT RULE BE ACTED UPON | TEST RULE | ACT ON RULE | RB | FIG. 12 |
| 22 | RB | 2 | RULE FAILED FOR USER AND THERE ARE NO MORE RULES. PASS NO SOLUTION TO USER AND REQUEST UNLOAD USER | ACT ON RULE | PASS NO SOLUTION TO USER. UNLOAD USER | APP RB | FIG. 13 |
| 23 | APP | 2 | USER RECEIVES A NO SOLUTION MESSAGE AND THE APPLICATION PROGRAM TAKES APPROPRIATE ACTION | APPLICATION PROGRAM | NONE | | FIG. 3 (18) |
| 24 | RB | 1 | USER 1 FINALLY RESPONDS TO QUESTION. PASS INPUT FROM USER 1 TO THE KNOWLEDGE BASE | GET INPUT | CONVERT INPUT | RB | FIG. 10 |
| 25 | RB | 2 | USER IS UNLOADED AND RULE BASE IS NOT BECAUSE USER 1 IS STILL IN AN ACTIVE SESSION | UNLOAD USER | NONE | | FIG. 14 |
| 26 | RB | 1 | CONVERT INPUT AND REQUEST THAT RULE BE TESTED | CONVERT INPUT | TEST RULE | RB | FIG. 11 |
| 27 | RB | 1 | TEST THE RULE FOR USER 1. ANSWER PASSES SO REQUEST THAT RULE BE ACTED UPON | TEST RULE | ACT ON RULE | RB | FIG. 12 |
| 28 | RB | 1 | RULE PASSES FOR USER SO DELIVER CAUSE/ SOLUTION AND REQUEST THAT THE USER BE UNLOADED | ACT ON RULE | PASS CAUSE/ SOLUTION TO USER. UNLOAD USER | APP RB | FIG. 13 |
| 29 | RB | 1 | USER IS UNLOADED AND A REQUEST TO UNLOAD THE RULE BASE IS SENT BECAUSE THERE IS NO ONE ELSE USING IT. | UNLOAD USER | UNLOAD RULE BASE | RB | FIG. 14 |
| 30 | RB | 1 | RULE BASE IS UNLOADED. NO USERS CURRENTLY USING RULE BASE. FINISHED... | UNLOAD RULE BASE | NOTHING | | FIG. 15 |

Fig. 23b.

MULTI-USER, ARTIFICIAL INTELLIGENT EXPERT SYSTEM

RELATED APPLICATIONS

The present application is a continuation application of patent application having Ser. No. 168,253, filed Mar. 15, 1988, abandoned as of July 11, 1990.

FIELD OF THE INVENTION

The present invention relates to artificial intelligent expert systems and expert system shells and, more particularly, to rule-based expert systems and shells that run in mini- and microcomputer environments where memory and speed are limited.

BACKGROUND OF THE INVENTION

Every program contains knowledge about some problem. A payroll program, for example, has knowledge about pay rate, deduction, and tax schedules. It also includes "common sense" knowledge about business practices and the number of hours in a week or days in a month. Expert systems are different from conventional programs in that they represent the knowledge in a high-level form. More particularly, expert systems are problem solving systems that reach expert or at least highly competent levels of performance. Instead of encoding knowledge in low-level statements, they store it in a knowledge base of rules and facts that stay close to the way people think about a problem.

What distinguishes an expert system from a conventional program is not just its expertise, but the way that the expertise is stored and processed. A payroll program, for example, certainly has more expertise about tax rate and deductions than most people, but it applies the expertise in a rigid, inflexible way. Furthermore, it cannot explain its knowledge or answer questions about its use: an employee who believes that the wrong tax rate was applied cannot ask the payroll program why it made a certain deduction. An expert system behaves more like an intelligent assistant. It can apply its knowledge in flexible ways to novel kinds of problems. Whenever it reaches a conclusion, the user can ask how that conclusion was reached and what rules were used to deduce it. For further discussion, see Walker et al. "Expert systemS AND PROLOG" (Addison-Wesley Publishing Company Inc. 1987), which is hereby incorporated by reference.

It is convenient to divide the development of an expert system into three main modules:

(1) a rule base,
(2) an inference engine,
(3) a user interface.

A rule base comprises the knowledge that is specific to the domain of applications, including such things as simple facts about the domain, rules that describe relations or phenomena in the domain, and possibly also methods, heuristics and ideas for solving problems in this domain. An inference engine knows how to actively use the knowledge in the rule base. A user interface caters for smooth communication between the user and the system, also providing the user with an insight into the problem solving process carried out by the inference engine. It is convenient to view the inference engine and the interface as one module, usually called an expert system shell, or simply a shell for brevity. For further information, see Bratko, "PROLOG PROGRAMMING FOR ARTIFICIAL INTELLIGENCE" (Addison-Wesley Publishing Company, Inc. 1986), which is hereby incorporated by reference.

Expert systems have been in existence for some time but, until recently, were only found in the large microcomputer area. As the power and speed of the microcomputer increased, a number of these expert systems have been ported to the microcomputer environment. Expert system shells have been designed, allowing users to create easier implementa-tions of the rule base, but there still exists two severe limitations to expert systems (especially when used in conjunction with microcomputers); they require a tremendous amount of memory, and they have been limited to dedicated use by a single user.

The advent of the 80386 microprocessor chip from Intel, and other high speed processor CPUs and the continued reduction of hardware costs in the microcomputer arena, has recently created a new flurry of interest and demand for knowledge-based systems at substantially reduced prices compared to earlier versions.

There are limitations with the present expert systems. As stated, they are still dedicated to single machines, limiting access to the rule base. This limitation creates another problem, which is expensive, repetitive hardware costs if one requires multiple use of the rule base, because the system needs to be duplicated on multiple single-user systems or run as separate, dedicated programs or tasks on a multi-user-based computer.

Finally, access has usually been limited to a single interface of a keyboard and a screen in a single language (English, Spanish, etc.). This limitation creates many access problems for the rule base, including inaccessibility to the system by many users and also severe limitations as to the type of interface that user could choose to communicate with the program.

With the foregoing in mind, there currently exists a need to provide an expert system design that allows multiple users to use and share the same system without duplicating it for each instance of use.

More particularly, the expert system must allow multiple users to share the same rule base, so multiple instances of the rule base need not be created.

There is also a need to allow provisions in the rule base to allow for multiple user interfaces so users can interface with the rule base through different languages, where the rule base can know and support, through additional applicational software, the proper communication requirements.

SUMMARY OF THE INVENTION

The present invention introduces an artificial intelligent expert system, which integrates multiple tasking capabilities to allow more than one user to interface with at least one rule base at one time without& the need for adding additional hardware for each instance of use or the need to load multiple rule base information for each user. Additionally, the present invention provides the capability of enabling the use of more than one language. The expert system allocates the system's resources evenly to all users, allowing for a smooth, degradation-free operation.

Briefly, one aspect of the preferred embodiment of the present invention includes an apparatus and method, utilizing a computer, for creating an expert system accessible by a plurality of users. The expert system contains at least one rule base. The at least one rule base contains knowledge for solving problems. The expert system provides rule base knowledge from the at least one rule base to the plurality of users.

The method for creating the expert system occurs in three steps. The first step entails coordinating communications between the plurality of users and the expert system. Communications consist of at least one inquiry, if any, and at least one response if any, to and from the at least one rule base. The second step involves buffering the at least one inquiry, if any, and the at least one response, if any, between the plurality of users and the at least one rule base. The last step requires inferencing the at least one inquiry, if any, and the at least one response, if any, with the knowledge contained in the at leas& one rule base.

Typically, the first step, discussed above, involves an additional step of enabling the communications to be in a user-specified language. This step may require the step of referencing an alternative language table for enabling the system to interpret and respond in the user-specified language. The alternative language table contains a first and a second key. The first key indicates to the system what is the at least one inquiry or the response. The second key indicates the language the user has specified. In this way, the language used by the user is transparent to the rule base system. Stated differently, the rule base system can be inferenced without having to modify the rule base to account for the different user-specified language.

Typically, the second step in the method for creating an expert system, may involve an additional step for buffering the at least one response, if any, and the at least one inquiry, if any, in at least one que. This procedure may also involve the step of managing the at least one response, if any, and the at least one inquiry, if any, with the at least one que.

The step for buffering may consist of a step for placing the at least one inquiry, if any, and the at least one response, if any, in a packet for temporary storage. The packet typically contains identification information for at least one user of the plurality of users. In this way the expert system is able to maintain some processing for each user of the system simultaneously.

The packet of user information can be updated after the step of inferencing occurs. In this way, the location of processing in the rule base for each user of the plurality of users is maintained.

DESCRIPTION OF THE DRAWINGS

FIG. 1c depicts a computer system equipped with a multi-user expert system for providing multi-access to a single rule base in accordance with the present invention.

FIG. 4 depicts a packet of information that may be placed on either one of the above-mentioned ques (FIG. 3);

FIG. 4a depicts a data file which is maintained by the Optional Language Support Module (16a, FIG. 2) for processing alternative languages by the expert system;

FIG. 4b depicts the OPTIONAL LANGUAGE SUPPORT routine for manipulating the data files shown in FIG. 4a;

FIG. 16 illustrates the way the expert system converts rules and compiles them into a form the system can process;

FIG. 17 is a listing of a rule base source listing before it is compiled by the expert system;

FIG. 18 is a listing of a rule base source listing after it is compiled by the expert system of FIG. 17;

FIG. 19 is the listing of FIG. 18 used for explaining the inferencing process of the inference engine;

FIGS. 23a and 23b are result tables depicting two users multi-tasking with the rule base of the expert system according to the present invention.

DETAILED DESCRIPTION

Figure 1A:
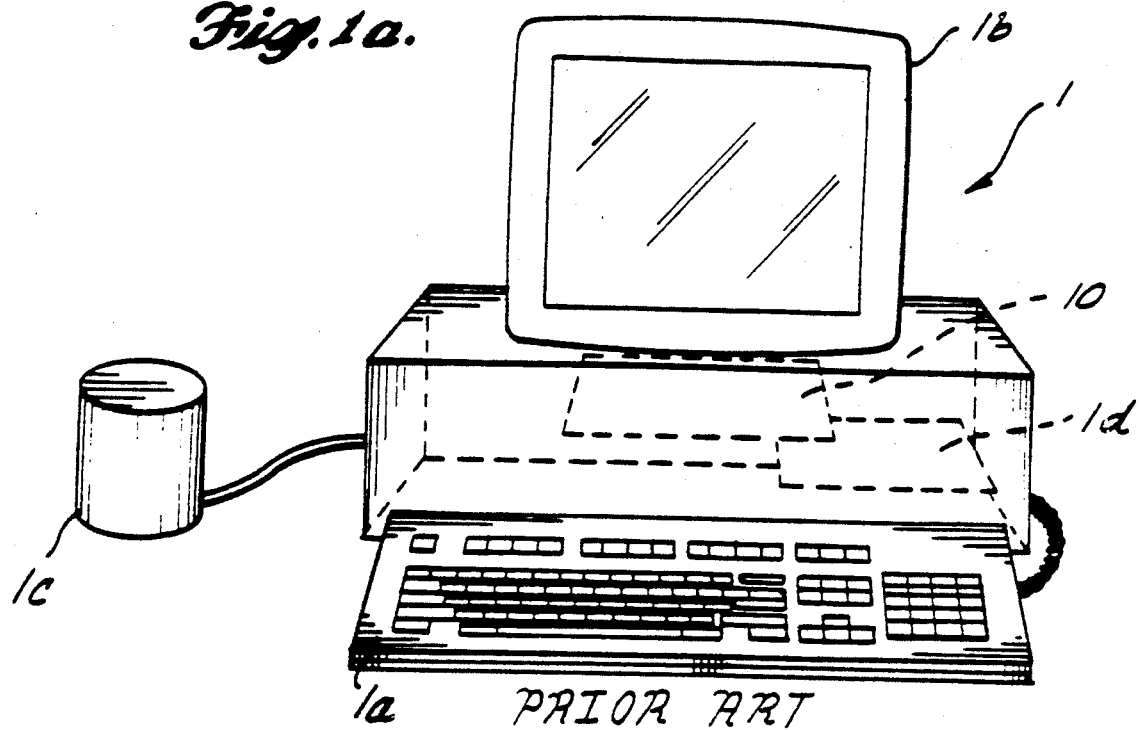
FIGS. 1a and 1b illustrate a typical knowledge rule-based expert system design.

By way of background, a typical expert system is now discussed and shown in FIG. 1a, where a single user works with a microcomputer 1, which has a keyboard 1a, screen 1b, expert system shell 10, and all the necessary components, such as memory 1d, hard disk 1c, etc.

Examples of expert systems include systems for medical diagnosis, or locating a failure in a certain type of equipment. These systems are capable of solving problems that require expert knowledge in a particular knowledge domain.

Figure 1B:
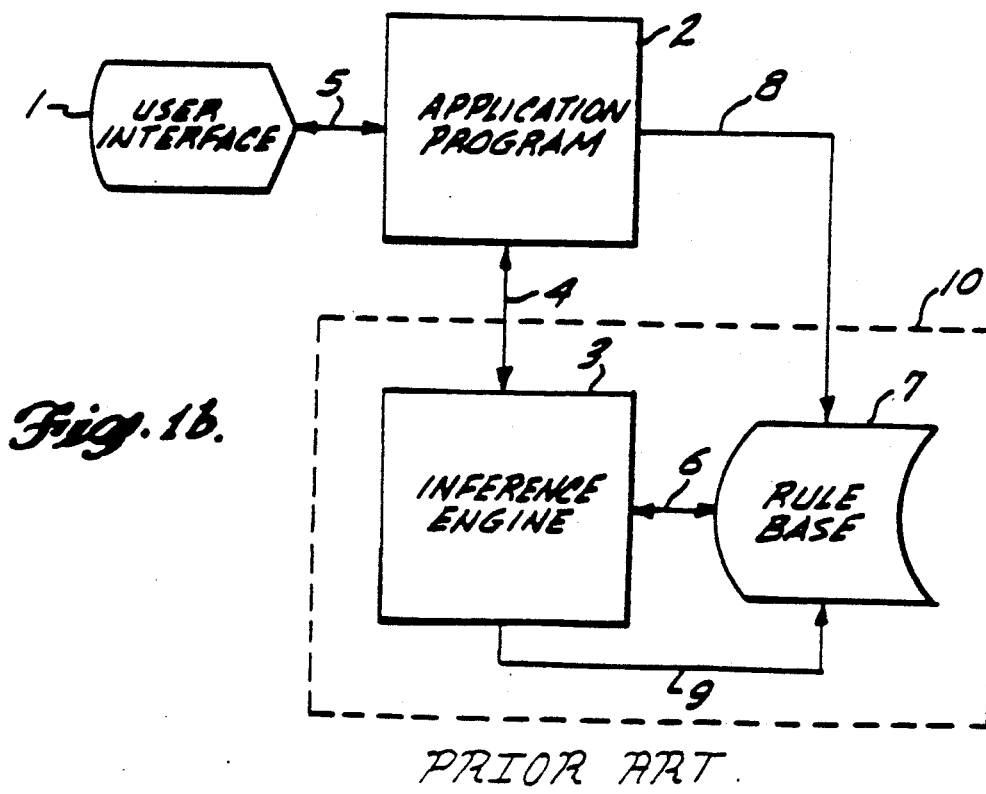

Referring to FIG. 1b, it is convenient to divide the development of an expert system into three main modules:

(1) a rule base 7,
(2) an inference engine 3,
(3) a user interface 1.

A rule base 7 comprises the knowledge that is specific to the domain of application, including such things as simple facts about the domain, rules that describe relations or phenomena in the domain, and possibly also methods, heuristics and ideas for solving problems in this domain. An inference engine 3 knows how to actively use the knowledge in the rule base 7. A user interface 1 caters for smooth communication between the user and the system, also providing the user with an insight into the problem-solving process carried out by the inference engine 3. It is convenient to view the inference engine 3 and the interface as one module, usually called an expert system shell 3, or simply a shell for brevity.

A user who wishes to use the rule base 7, depicted in FIGS. 1a and 1b, would interface with the computer through its keyboard and screen 1b and would access an application program 2 which, in turn, would access the inference engine 3 to give the user access to the rule base 7.

When the expert shell 10 is first activated by the application program 2, it loads the rule base 7, unless this rule base 7 is already compiled into the application program itself. Then the inference engine 3 uses its inferencing capabilities to select pertinent information to be passed to the application program which then, in turn, processes this information, or even passes the information to the user, perhaps in the form of a question to be asked.

Once the user has supplied an answer to the question (or the application program could internally supply an answer itself), the application program 2 passes the answer to the inference engine 3, which takes such information and uses it to continue its processing procedures for accessing the rule base 7.

This process continues back and forth until a resolution to the problem at hand is solved, or until the inference engine 3 determines that no solution can be reached from the rule base 7.

By changing, adding, or deleting to the rule base 7, the results obtained by the user will vary. Unlike conventional linear programming, a rule base 7 is more randomly added to, and the order of entry into the rule base 7 is determined by the inference engine 3 based on the information it has gathered from both the rule base 7 and the user through the keyboard and screen I. Thus, information can be more easily changed, and the system can be taught more knowledge, or even train itself by having the application program 8 or the inference engine 3 directly modify the knowledge base 7, which offers decided advantages over conventional programming for executing artificial intelligence-related tasks.

The above-referenced expert system does not allow accessibility of knowledge by multiple users at the same time and limits the dissemination of information in only one spoken language. The application program 2 communicates with the inference engine 3 through a two-way procedure 4 that is dedicated to a single application at any one time.

From the forgoing, it is seen that, if multiple users wish to gain access to the knowledge base at the same time on the system depicted in FIGS. 1a and 1b, multiple copies of the inference engine 3 and rule base 7 must be loaded into memory, taxing the hardware system and sometimes even requiring a separate dedicated system to be used for each instance of use.

FIG. 1c shows a typical computer configuration for an implementation of the invention on a microcomputer that supports multiple users. In this configuration, there could exist many different types of input devices 1500, from a screen and keyboard to a terminal, or a modem or even an interface a telephone using digitized voice response. The type of interface would be determined by the computer 1502 configuration. The basic computer components are on a conventional plug-in board 1504, CPU and associated hardware, computer memory, the appropriate storage devices, and CPU support programs.

Figure 1D:
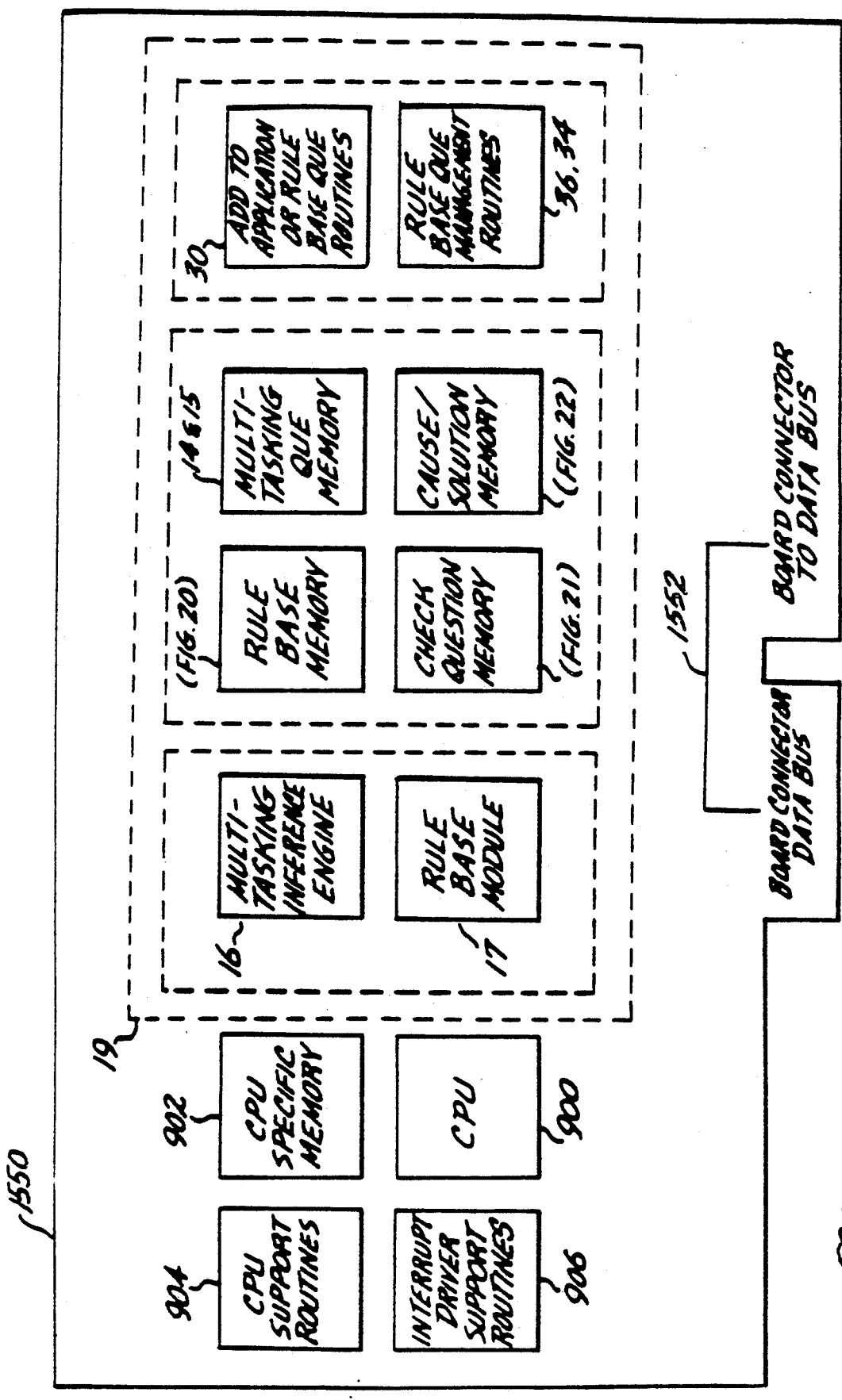
FIG. 1d depicts the expert system on a single plug in board which includes software programs and/or hardware for providing multi-user access to a single rule base.

FIG. 1d shows the invention as it is implemented in a hardware and/or software design for a plug-in board 1504 that plugs into the bus of an existing computer. This type of implementation allows the computer 1506 (FIG. 1c) to handle all application programs, disk I/0 and user interfacing without having to give up significant overhead to handle the knowledge base routines.

The plug-in hardware board 1504 has its own CPU 900, and various required software support routines (CPU Specific Memory 902, Interrupt Driver Support Routines 906, CPU Specific Routines 904) to allow it to handle all the function of the expert system 19 (FIG. 1d).

The board 1504 communicates with the computer 1506 through the data bus 1552 (FIG. 1d) and could support interrupt driven DMA (Data Management Access) transfer or PIO (Programmed Input and Output).

An installable driver routine on the main computer would handle all the low-level communications and would allow the application program 2 to communicate using a high level language function call.

The expert system on the board 1504 is comprised of a Multi-tasking Inference Engine 1b and Rule Base Module 17, Rule Base Memory (FIG. 20), Check Question Memory (FIG. 21) and Cause Solution Memory (FIG. 22), the ADD TO QUE Routines 30, and the Application and Rule Base Que Management Routines 34 and 36.

One advantage of a board implementation is that it could offer an additional processor to be used in the rule base processing. This implementation could even allow parallel processing where the application program might run on the base processor and the rule base functions run on the add-in board processor which also could have its own memory for rule base storage.

PREFERRED EMBODIMENT OF MULTI-USER EXPERT SYSTEM

Figure 2:
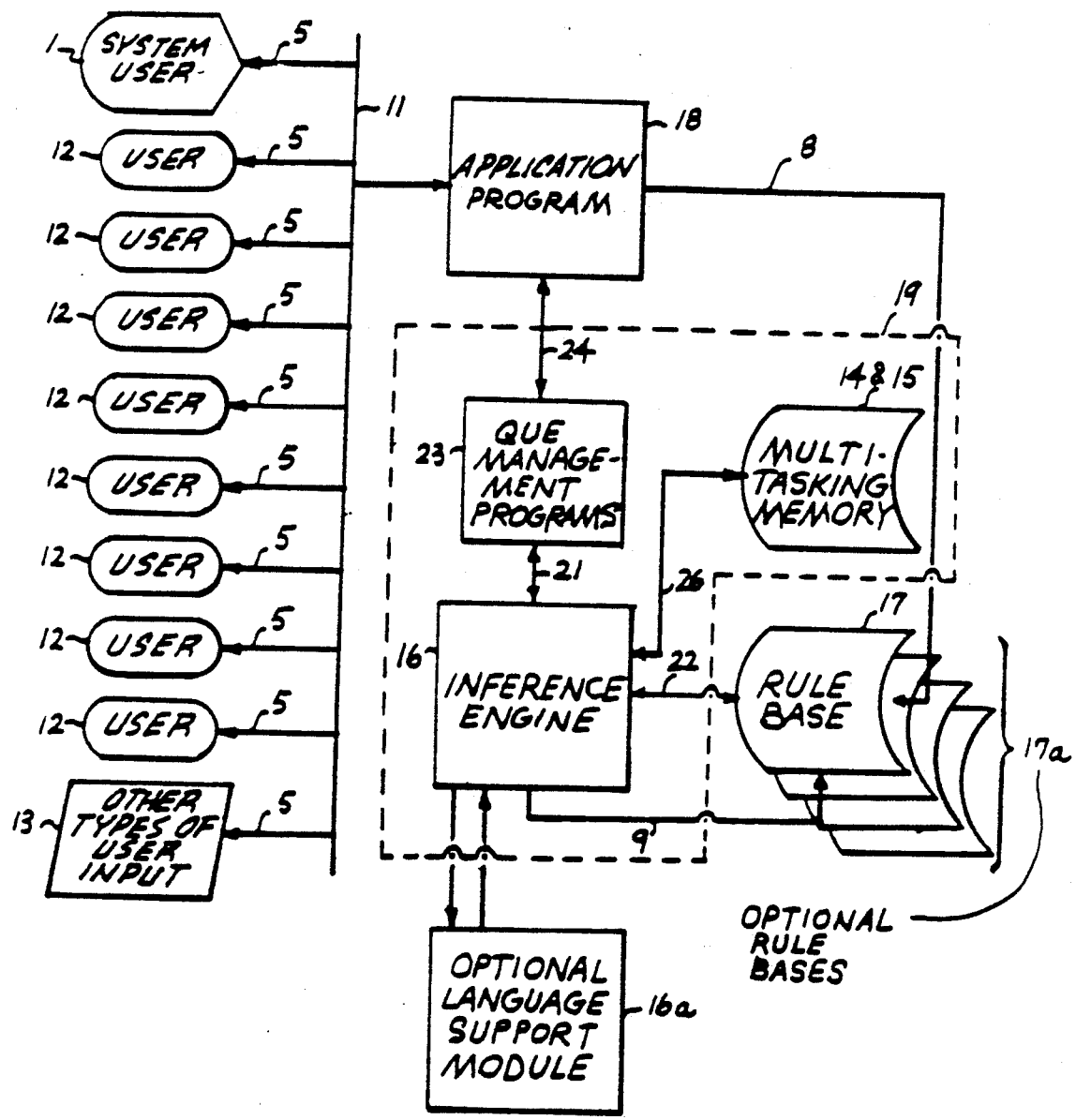
FIG. 2 is an overall functional block diagram of the software modules and memory modules for providing multi-tasking capability to at least one rule base, in which the present invention is incorporated.

FIG. 2 illustrates the preferred embodiment of the present invention. Essentially, the expert system 10 in FIG. 1b is replaced with the multi-tasking and/or multi-lingual system 19, as shown in FIG. 2.

In the preferred embodiment, expert system 19 diagnoses problems and delivers solutions to multiple users in multiple languages who access it through the application program 18. The preferred embodiment is also capable of supporting multiple rule base 17a. The purpose of each rule base would be for providing a specific application domain to the expert system. For example, one rule base may be dedicated to computers, their related problems, causes and solutions. Another rule base may be dedicated to cars, their problems, causes and solutions.

Since the multi-user inference engine 16 must now deal with many users, the expert system has been enhanced with the Que Management Module 23, a Multi-tasking Memory 14 & 15 and an Optional Language Support module 16A.

Figure 3:
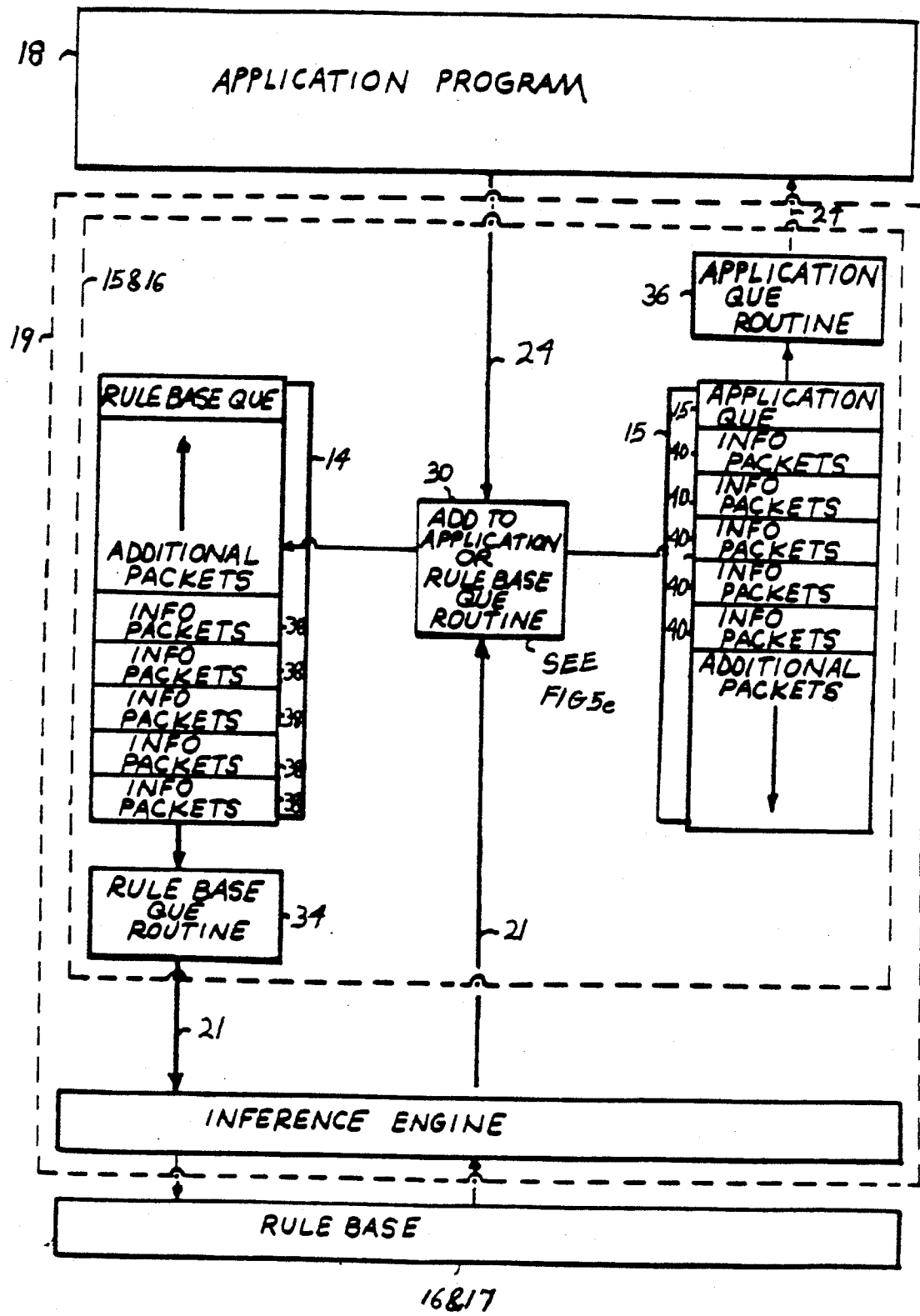
FIG. 3 depicts the application and rule base ques and their associated que management routine.

Referring to FIG. 3, a more detailed description on how the expert system 14 accommodates multi-tasking and multi-user capabilities is further discussed. More particularly, two multi-tasking memory buffer ques 14 and 15, located in the multi-tasking memory 23, are utilized. Ques 14 and 15 are identical in form. They are First In First Out (FIFO) stacks used as temporary memory. These ques are necessary because the entire application 18 is no longer running in a single tasking environment where either the application program 18 or the rule base 19 are allowed to tie up computer time without concern to degradation of system performance. With multiple users, accessing the rule base 19 and application program 18 must be carefully planned to enable all users equal time access.

As a result, the ques are used to que up requests from users in the rule base que 14 and to que up information coming from the rule base 17 that is destined for the application program 18 in the application que 15. These ques serve as temporary holding areas for packets of information which are serviced by their respective que processing functions 34 and 36.

Packets 38 destined for the rule base que 14 are formatted by the application program 18 and added to the que by calling the ADD TO QUE routine 30 that handles the addition of packets to the ques 14 and 15. An example of a packet is shown in FIG. 4 to be discussed more fully shortly.

Similarly, the inference engine 16 formats the packets destined for the application program 18 and adds them to the que 15 by calling the ADD TO QUE routine 30 that also handles addition of packets to the application que 15.

The ADD TO QUE routine 30 handles all housekeeping for the ques 14 and 15, returning errors if full and processing packet entries, if any exist, on a FIFO (First In First Out basis) to ensure priority to the earliest request, with the exception that there will be time when the routines must intervene in the FIFO routine to handle aborts by the user; at which time the routine may opt to purge several packet entries and replace them with a single or new group of entries.

The primary purpose of the ques 14 and 15 is to allow the INFERENCE ENGINE routines (FIGS. 6a, 6b, and 6c to be discussed), which can involve very complex and lengthy computations, to be broken up into slices of computational functions in order to shorten the amount of contiguous CPU time the inference engine 16 takes up at any one time.

Prior art designs, such as FIG. 1, are incapable of processing other requests if they are waiting for user input information. For this reason, a multi-user environment would be totally out of the question for the prior art system.

According to the present invention, FIG. 3, the rule base 17 can continue to process events from multiple users because, instead of waiting for an answer to be input by a user, the system places a request for an answer on the application que 15 and then processes additional requests from the incoming rule base que 14.

By buffering the information in the matter described, an even, streamlined processing of all user requests is achieved.

The information packets 38 and 40 for ques 14 and 15 respectively contain pertinent information that allows the application program 18 or rule base 17 to properly process.

FIG. 4 depicts the packet-fields of a typical packet and what they are used for; however, depending on the specific application, the length and amount of information contained in the packet fields will vary.

The owner field 52 is the user number passed which the rule base 16 and application program 18 use to differentiate between users.

The rule base state 54 and rule base event 56 fields are used to store the present state and event to indicate where the particular user is in the rule base query process. The RULE BASE QUE routine (34, FIG. 3) for the rule base que (14, FIG. 3) uses this information to direct the request to the appropriate function in the inference engine (16, FIG. 3).

The type of packet 60 is used by the rule base (16, FIG. 3) to determine what type of user input the information is coming from so it knows what format to process it in. Type of packets 60 could tell the rule base the input is coming from the main keyboard and screen, a terminal emulating a specific protocol, a network user on a specific network, or a request using digitized voice response and DTMF signals over a voice telephone, just to mention a few. Each type of input has different functions that must be performed, and this type of packet identifier allows each input type to be differentiated.

The input string field 58 can take several forms and is the input information coming from the user of application program(s) that must be passed to the rule base. It can take the form of a complete string containing the information, a string ID that points to a memory location or file 10 record of information, or even an atom number that references a string of information.

If the packet is one destined for the application program (18, FIG. 3) from the rule base (16, FIG. 3), then the input string 58 would contain specific information to be asked of the user, like a question "What product are you having trouble with?".

If the packet is one destined for the rule base (16, FIG. 3) from the user, then the input string 58 might contain a specific answer in response to a particular question asked. For example, in response to the question asked, "What product are you having trouble with?", the user might answer "IBM PC", which will be passed to the rule base via the que packet.

The certified field 62 is used to tell the rule base (16, FIG. 3) that the application program (18, FIG. 3) needs a verification the packet of information was received and processed by the rule base. This field is optional and is useful in certain circumstances, like notifying the application program (18, FIG. 3) that the rule base (16, FIG. 3) was loaded successfully, and that there was enough memory to do so.

The user state and event fields 66 and 68 are used to pass the current state and event that the user interface is in. This allows the rule base to know what state the user is in. An example of a user state could be a user terminal that is not responding. In a more complicated user interface such as what a user is interfacing through a touchtone phone and the user is receiving diagnostic information from digitized voice response and responding by pushing the touch tone buttons, the user state and event might inform the rule base of the state the user's telephone line is currently in.

The ques are serviced by their appropriate que processor routine (FIGS. 3, 34 and 36) which are serviced by the application program 18 and the inference engine 17, or externally if added to a driver or terminate-and-stay resident program.

The language-type field 64 is user to inform the application program (18, FIG. 3) and the Optional Language Support Module (16A, FIG. 2) what language the user is using. This allows for the proper processing cf information and the calling up of information in the proper language. It should be noted that there need not be a different rule base for each language supported. In one embodiment of the invention, rule base is written in one spoken language, and additional foreign-language information is supported by the Optional Language Support Module (16, FIG. 2), which contains a look-up table. More particularly, the Optional Language Support Module (16a, FIG. 2) allows users to interface with the expert system in foreign languages other than the one the rule base is written in. The word language used here is not to be confused with a program language; as used here it is meant to be the written/spoken language the user is conversing in.

As an example, the expert systems main language might be English, but a user might want to converse in Spanish, and another user might want to converse in French. The Optional Language Support Module 16a allows this to happen without having to provide a separate rule base for each language. A more detailed discussion on the operation of the Optional Language Support Module will be presented shortly.

Referring to FIG. 4a, a data file containing the basic questions to be asked of a user by the rule base during a diagnostic session is shown. This particular data file stores a record for each question to be asked during a session by a rule base in the primary language 1808 as well as a duplicate record for each question in all the foreign languages available 1814 in the expert system.

In FIG. 4A, an English record 1808 is shown for the question that asks what "type of demo" is requested. The foreign records 1814 store the same question information but instead of being in English, they are in their respective languages.

Each record can be accessed by two keys. The first key is the Language Access ID 1802 and is used when accessing the information while the expert session is in progress. Since the rule base is written in the primary language (in this case English), all records 1808 and 1814 must have the same Rule Base ID 1800 that is imbedded in the rule base (1002, FIG. 19, more thoroughly discussed shortly) and used to access the question information.

The Language specifier number 1812 which does not exist in the rule base ID (1002, FIG. 19) is an additional part of the first key that allows the proper record to be accessed for the proper language. The value of 0 is set for the primary language and in this case (1812, FIG. 4a), 1 stands for Spanish, 2 stands for French and 3 stands for German and so on. This number is passed to the Language Support Module in the Language Type field (64, FIG. 4) of the que packet.

The second key, the Foreign Language ID 1804, is used externally to an active diagnostic session and is used by the application program (18, FIG. 2) to access the record for updating and changing of the wording of question information contained in the record. Since a German record would be best called up using a German ID 1804, record 1816, this ID would be the German translation of TYPE OF DEMO.

Whenever a secondary language record 1814 is created for a primary language record 1808, the Language Specifier 1802 and Language Access ID 1800 are transparently assigned.

Figure 4B:
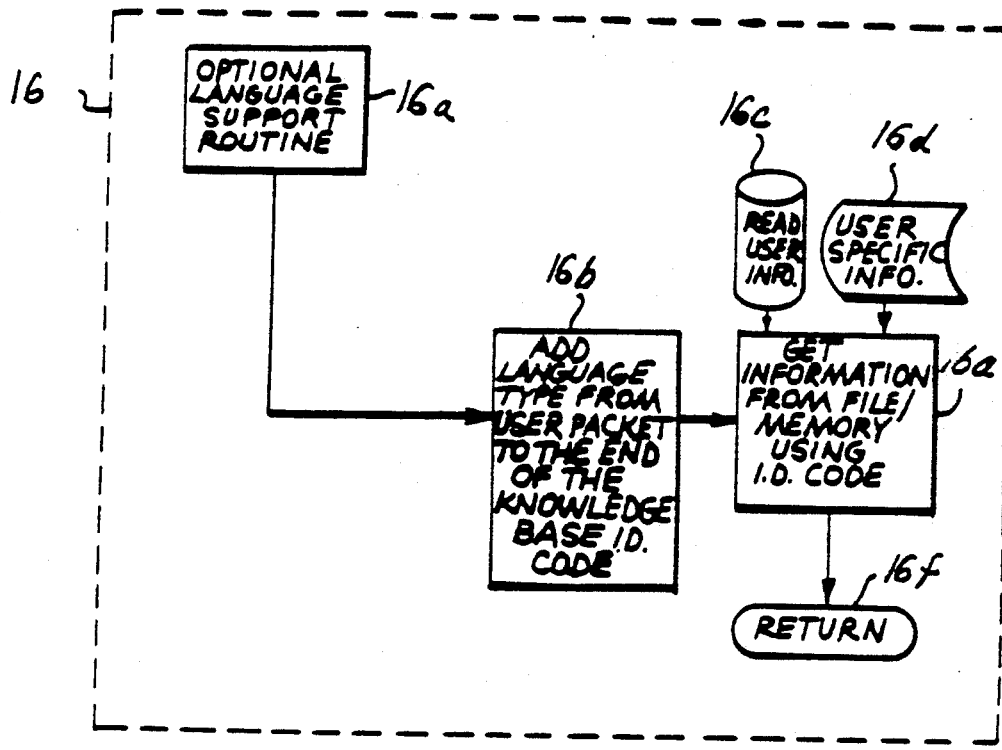

FIG. 4b shows in detail how the Optional Language Support Module 16a operates. When a decision is made to get information such as a question to be asked of the user, the Optional Language Support Module 16a is called. At block 16b, this module takes the Rule Base IE and adds to it the Language Type (64, FIG. 4) creating the new Language Access ID Flag (1802, FIG. 4a). The Language Access ID is really the Rule Base ID code of the question to be asked plus the Language Specifier Number 1802 which references the proper language record.

If the Language Type in the packet is 3, for German (as shown in FIG. 4a), and the Rule Base ID 1800 for the question information to be asked is "TYPE OF DEMO", then the Language Access ID 1802 would be "TYPE OF DEM03". By calling a record out of the database file 1810, the record 1816 would be retrieved, which is German, at block 16e.

If the Language Type on the packet is 0 (as shown in FIG. 4a), which stands for the base language of English, and the Rule Base ID 1800 for the question information to be asked is "TYPE OF DEMO", then the Language Access ID 1802 would be "TYPE OF DEMO0". At block 16e a record is called out of the database file 1810, the record 1808 would be retrieved, which is English.

The only difference between the Additional Data Information 1806 for all records with the same Rule Base ID 1800 is that the data is in the specified language as set forth in the Language Specifier Code 1812.

By keeping the rule base in the main language and having duplicate data information in records 1808 and 1814 that are referenced during the session, only one rule base need be created in the primary language. Users then pass their Language Type 64 in the information packet FIG. 4 which is used by the Language Support Module to retrieve information on the proper language.

Figure 5A:
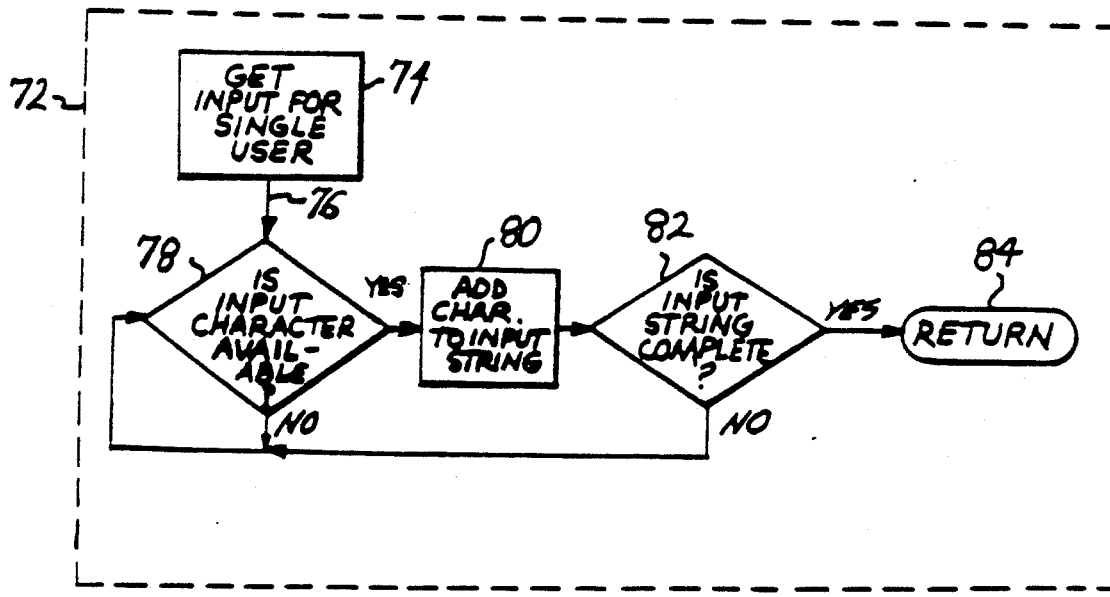
FIG. 5a illustrates the GET INPUT routine for a single tasking input routine used to retrieve characters from the user as they are entered.

FIG. 5a shows a typical input routine 72 which would be referenced by the application program 18 (FIG. 1) and used to get characters input by a user from a keyboard (or other input device) on a single-task dedicated system. The routine loops (78, FIG. 5a) waiting for a character to be input. When one is found, it adds it to the input string at block 80 and checks to see if the input string is complete at block 82, and, if so, it returns the string at block 84. If not, it reenters the loop (83, FIG. 5a) and continues waiting again.

Figure 5B:
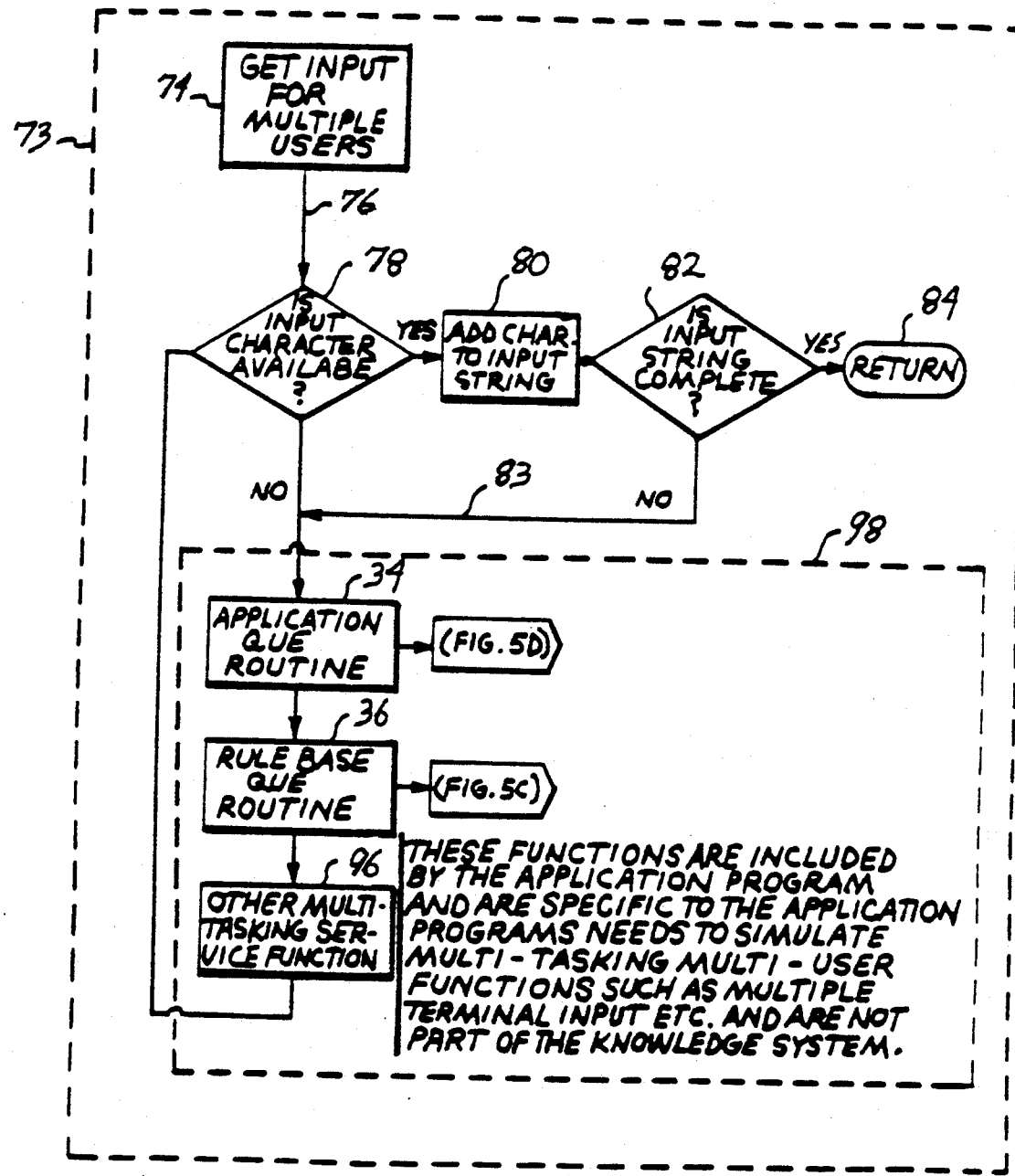
FIG. 5b illustrates the GET INPUT routine for multi-user capability according to the present invention.

FIG. 5b shows the input routine 73 needed to get characters for a multi-tasking, dedicated system. More particularly, FIG. 5b shows how the present invention handles multi-tasking under the worst case scenario, an application that is running on an operating system that does not support multi-tasking, such as DOS.

The following example will show how the input routine (FIG. 5b) is modified to enable servicing of the various necessary multi-tasking routines to simulate a multi-tasking, multi-user environment.

In the worst case situation, the que processing routines 34 and 36 (FIG. 3) are continually serviced within the input loop 79 of the application program 18 where unused CPU time is wasted while waiting for user input from the main computer keyboard (this is where you might also put service routines to support other user input like multiple terminals 13) (96, FIG. 5b). As the input routine 73 checks for each character to be input from the main system user at blocks 78, 80, and 82, it calls the que processing routines 34 and 36, which pull information packets from the ques 14 and 15 (FIG. 3), unformat the information, and then call INFERENCE ENGINE routine (118, FIG. 5c) and (148, FIG. 5d) within the que processor routines 34 (FIG. 5c) and (36, FIG. 5d).

The INFERENCE ENGINE routine (FIGS. 6a, 6b, and 6c) processes the information and, if necessary, add their requests to the ques 15 (FIG. 3), and then return to the que processing routine 32 (FIG. 5c) and 36 (FIG. 5d), which return control of the program to the input function.

The que processing routines 34 and 36 use the packet information to determine proper direction of the information to the proper routine in either the application program 18 or the rule base 16.

Figure 5C:
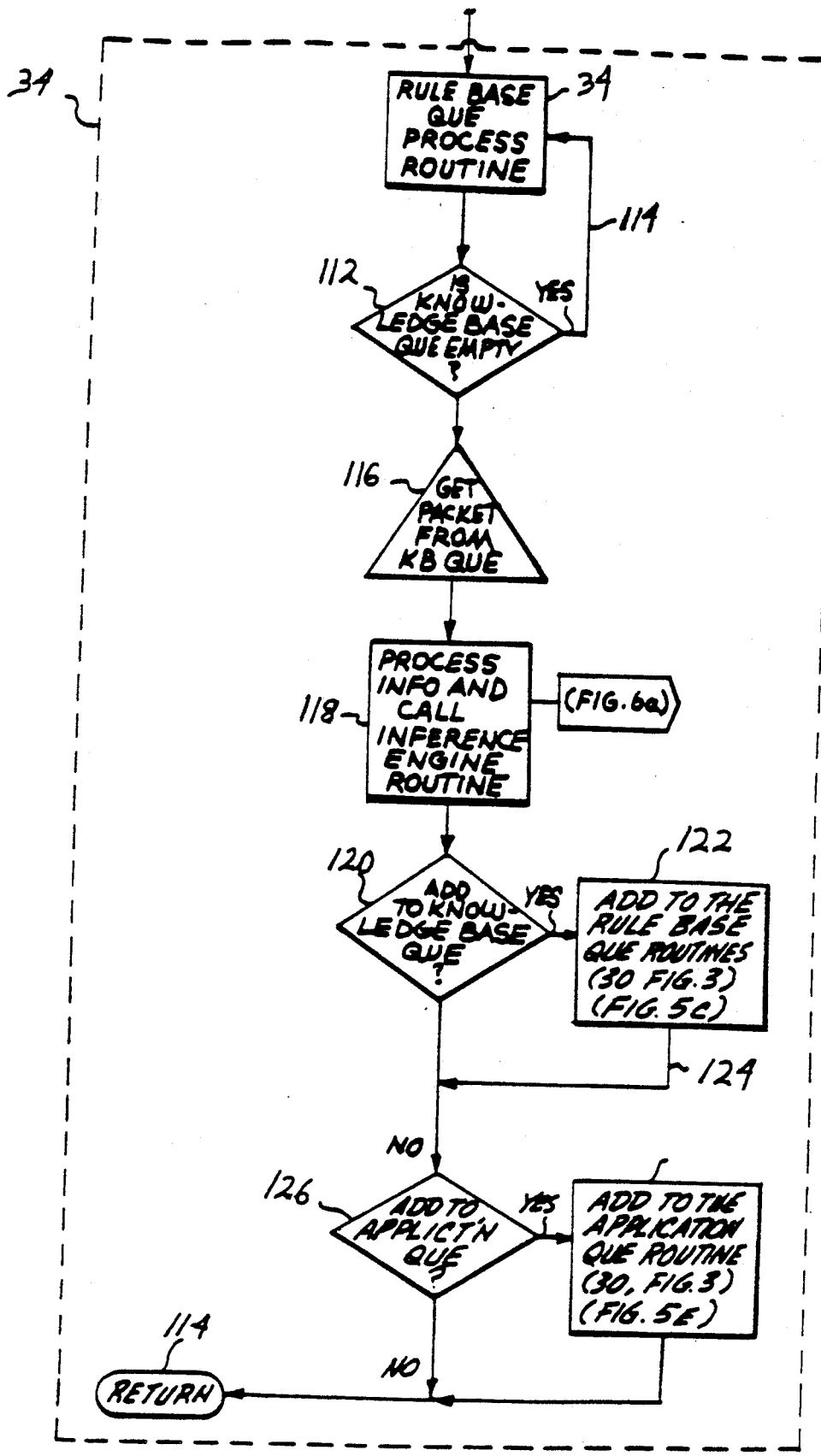
FIG. 5c illustrates the RULE BASE QUE routine referenced in FIG. 5b.
Figure 5D:
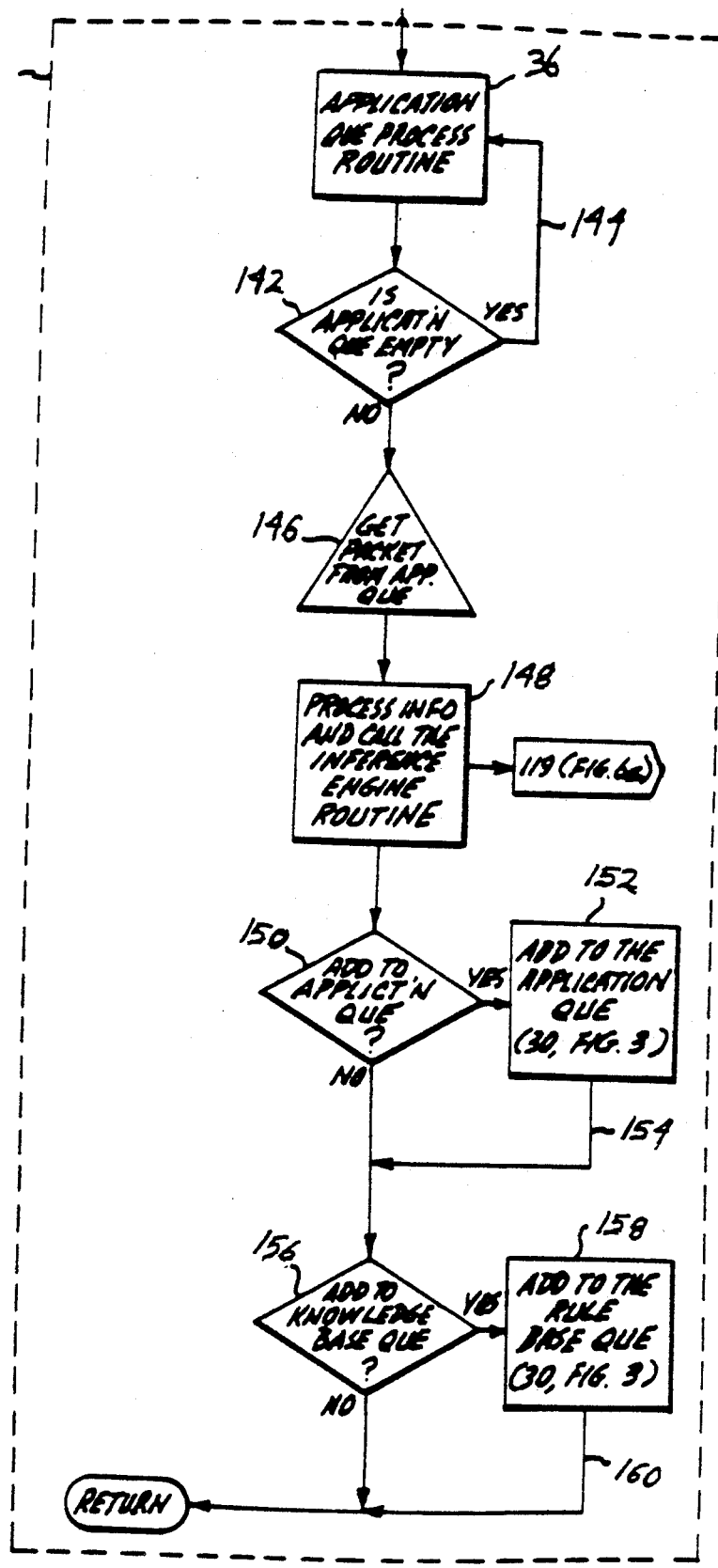
FIG. 5d illustrates the APPLICATION QUE routine referenced in the GET INPUT routine of FIG. 5b.

FIG. 5c depicts in detail the RULE BASE QUE routine 34 and how it interacts with the rule base. The RULE BASE QUE 34, which is called FIG. 5b at 34, to see if there is an entry in the que (112, FIG. 5c). If there is no entry on the que 14 (FIG. 3), the routine exits at block 114. If there is an entry on que 114, then a packet is taken from the que and unformatted. The system then calls the appropriate routine of the INFERENCE ENGINE routine (FIGS. 6a, 6, and 6c). Then it checks if any information needs to be added to the ques during blocks 120 and 126, and, if so, calls the appropriate ADD TO APPLICATION OR RULE BASE QUE routine (FIG. 5e) at blocks 122 and 128, and then returns at block 114.

Figure 5E:
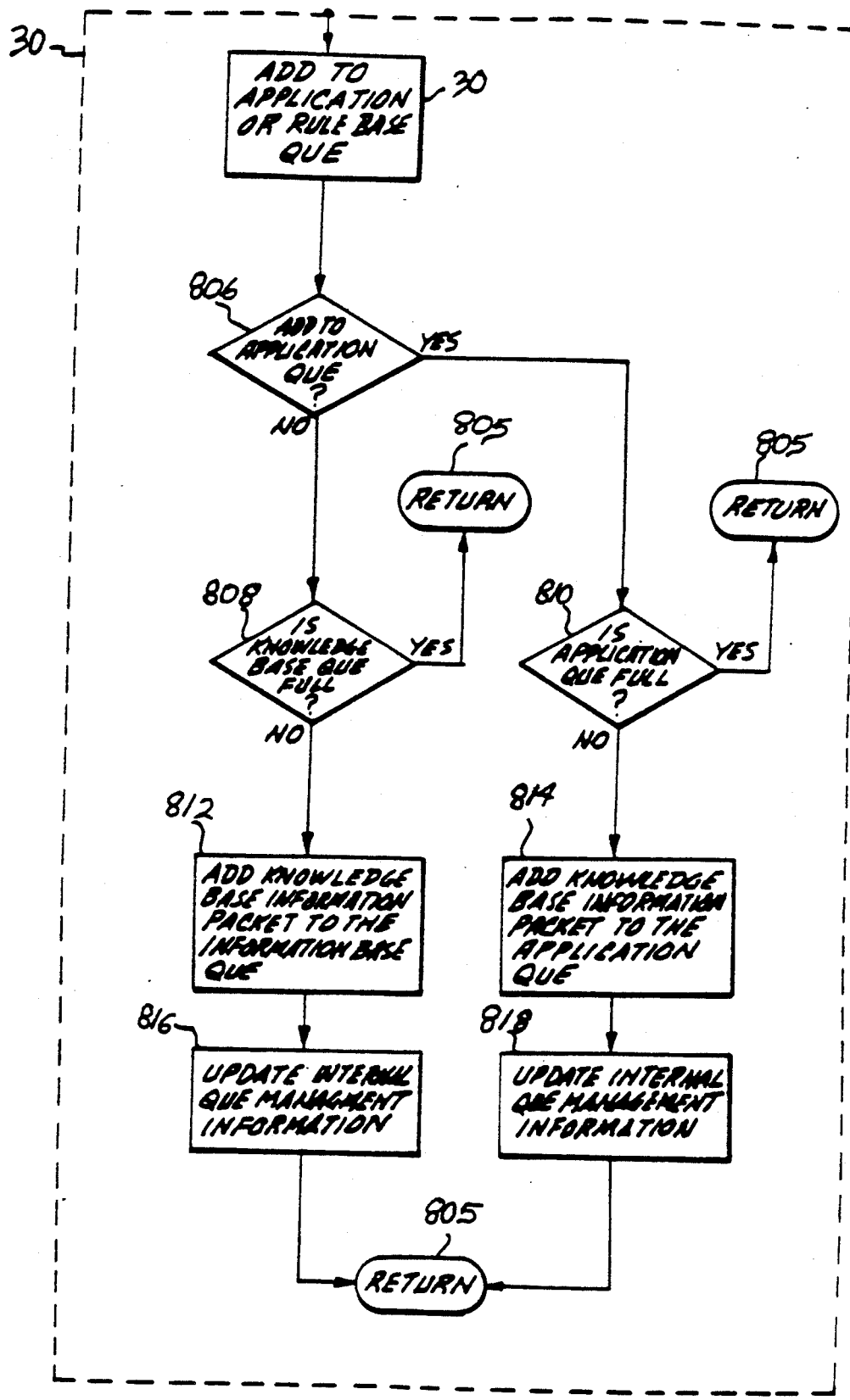
FIG. 5e illustrates the ADD TO APPLICATION QUE or ADD TO RULE BASE QUE routine.
Figure 6A:
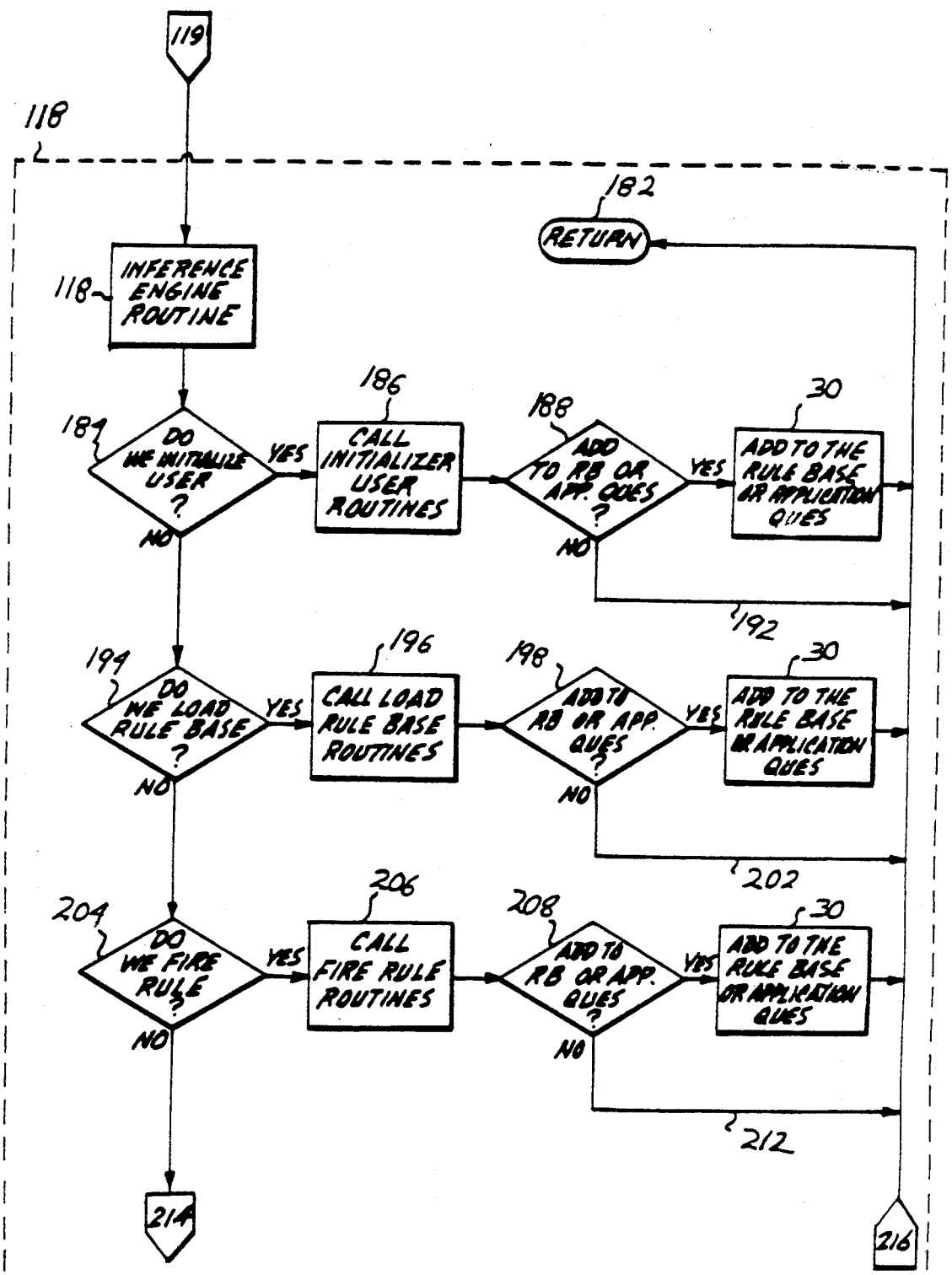
FIGS. 6a, 6b, and 6c illustrate the INFERENCE ENGINE routine receiving, processing, and sending information, as well as how the RULE BASE QUE routine (FIG. 5c) manages the internal calls of the inference engine.

Referring to FIG. 5e, the ADD TO APPLICATION OR RULE BASE QUE routine is now discussed. This routine essentially coordinates the addition of a packet of information to either the application que or the rule base que. At block 860, the que management system (23, FIG. 2) determines whether a packet of information needs to be placed on the knowledge base que or the application base que. If the rule base is assembling a packet of information to be placed on the application que, then at block 810, the que management system determines whether the application que is full. To determine whether or not the application que is full, the system reviews the status of two variables (not shown) associated with the que. The first variable contains information on how much packet memory is left in the que and the second variable contains the next available location within the que. Assuming that the variable containing the information on the remaining available spaces of packets shows that the que is full, processing returns at block 805 with an error message to the user. If there is memory remaining in the que, then at block 814 the packet will be placed on the que in the next available location pointed to by the second variable. At block 818, the first and second variables are updated to reflect the changes in the que, and processing returns at block 805 to the calling program.

Returning to block 808, if a packet of information needs to be formatted and placed on the knowledge base que, then at block 808 the Que Management System determines if the knowledge base que is full. Like the application que, the knowledge base que has two variables associated with it (not shown). Assuming that the knowledge base que is full, processing returns to block 805 with an error message to the user. If the knowledge base que is not full, then at block 812 the packet of information is placed on the que in the next available location pointed to by the second variable. At block 816, the variables associated with the knowledge base que are updated to reflect the changes to the que, and at block 805 processing returns to the calling program.

Figure 6B:
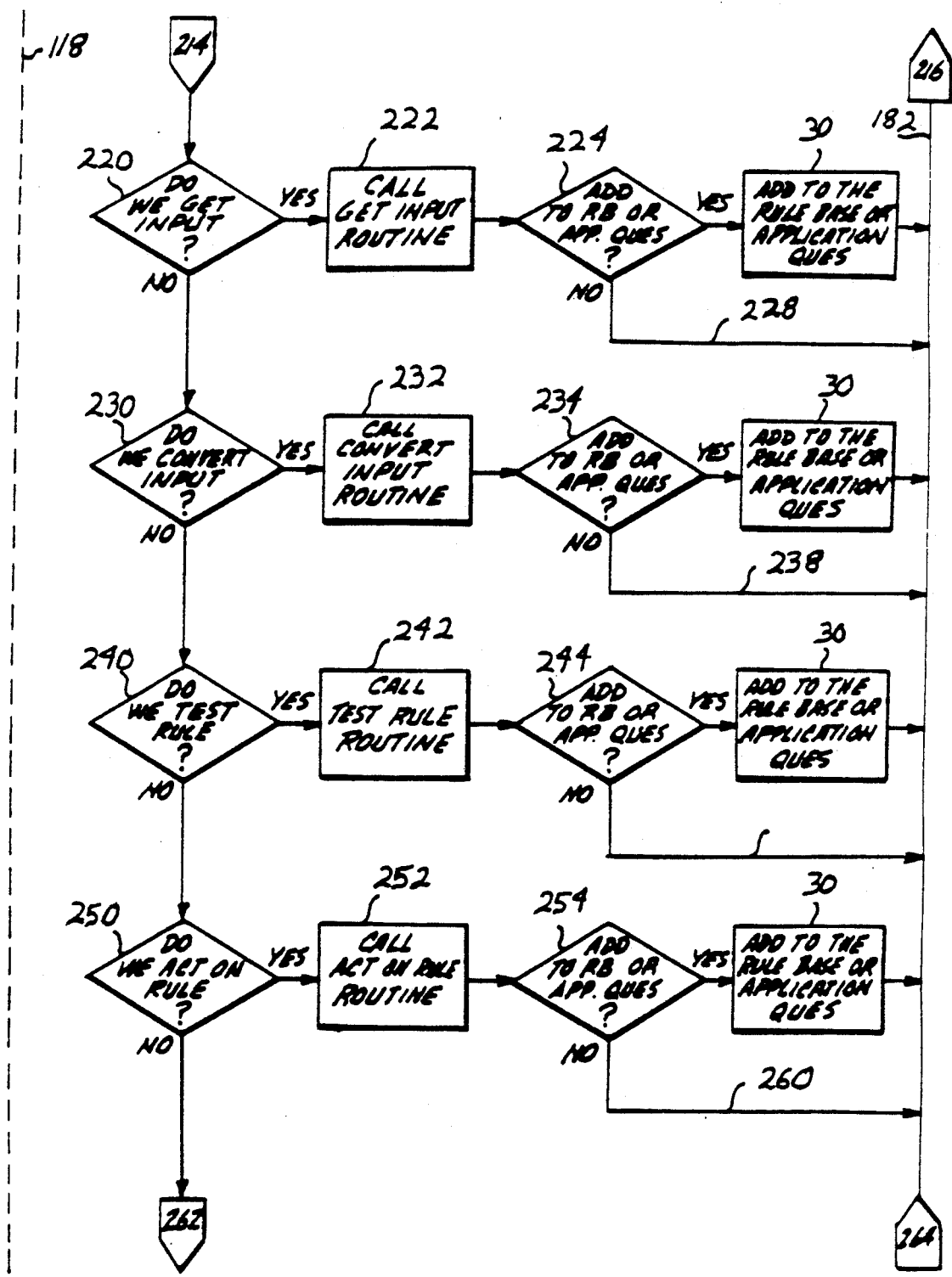
Figure 6C:
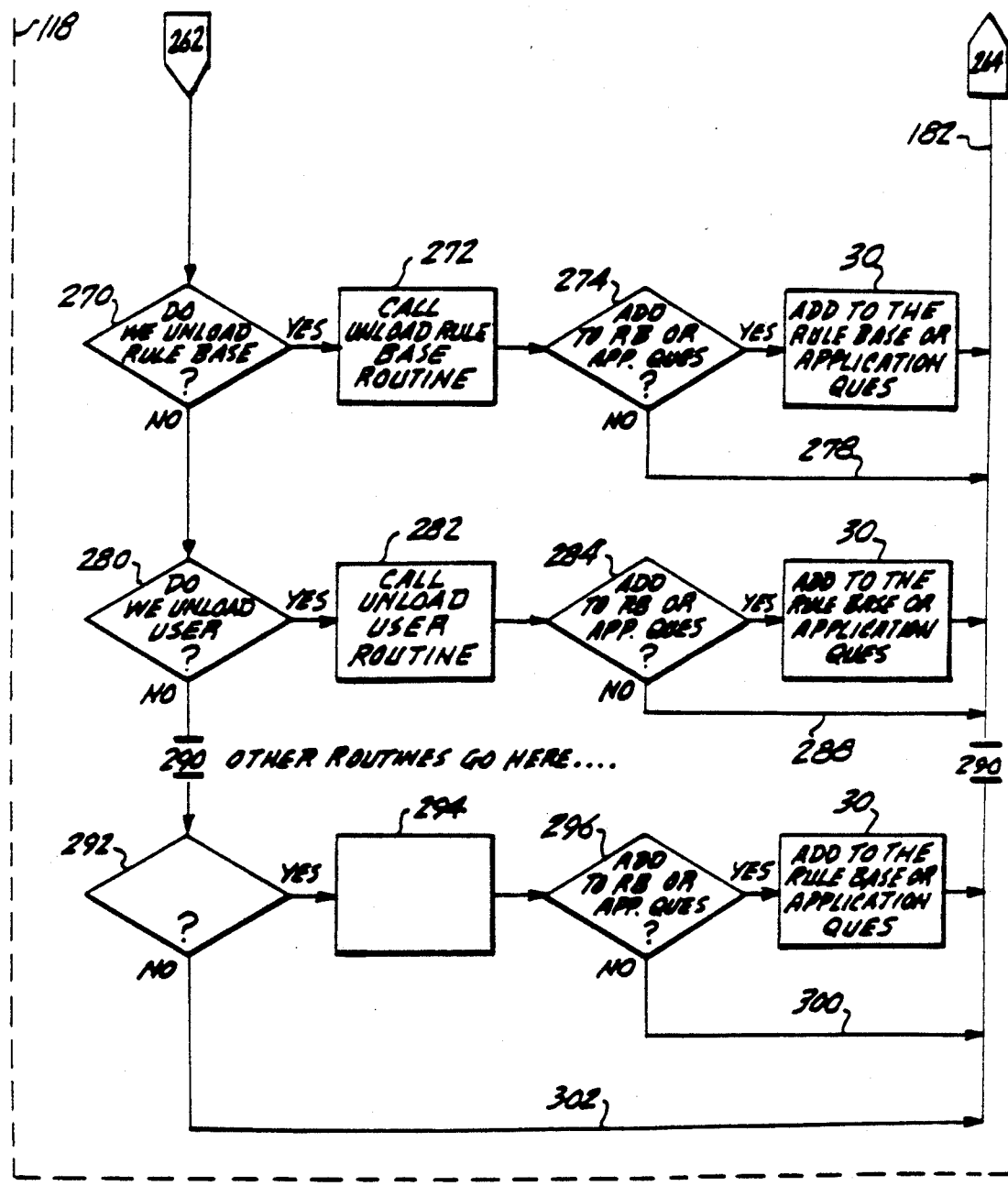

FIGS. 6a through 6c detail various subroutines called within the inference engine 17 of the expert system 19 (FIG. 3). Flow charts 6a, 67b, and 6c are intended to show more clearly how the expert system 19 (FIG. 3) has been substantially changed from prior art systems to be able to service and process a rule base in a multi-tasking, multi-user environment.

In order to allow the inference engine to be used by many users simultaneously without degradation, the inference engine is split up into specific routines at blocks 174, 186, 196, 206, 222, 232, 242, 252, 272, 282, 294 that can be called by the que processor routines that service these routines (to be explained in detail). These called routines are similarly designed to return control back to their calling routines quickly so program execution can continue. In order to do this, the routines 174, 186, 196, 206, 222, 232, 242, 252, 272, 282, 294 place any requests for information onto the applications que via the ADD TO RULE BASE or APPLICATIONS QUE routine 30 (FIG. 3).

If the expert system (19, FIG. 2) is being accessed by a user for the first time by the application program 18, a packet is placed on the rule base que (14, FIG. 3) by the ADD TO QUE RULE BASE routine (30, FIG. 3) and passed to the que 14, where it remains until the RULE BASE QUE routine (34, FIG. 5c) retrieves the packet (38, FIG. 4) and identifies its function request to initialize the rule base (16, FIG. 3).

The RULE BASE routine (94, FIG. 5c) processes the que information packet 118, which causes the LOAD RULE BASE routine (FIG. 8) to be called. FIG. 6a shows how the expert system calls the various subfunctions of the inference engine 17 (FIG. 3). Usinq information supplied from the info packet it pulled from the que, it determines 194 that the LOAD RULE BASE routine should be called.

The LOAD RULE BASE routine is called 196, and then any necessary requests are placed on the knowledge base or application ques via the ADD TO THE RULE BASE or APPLICATION QUE routine 30, FIG. 3, and then control is returned to the calling routine at block 182.

Figure 7:
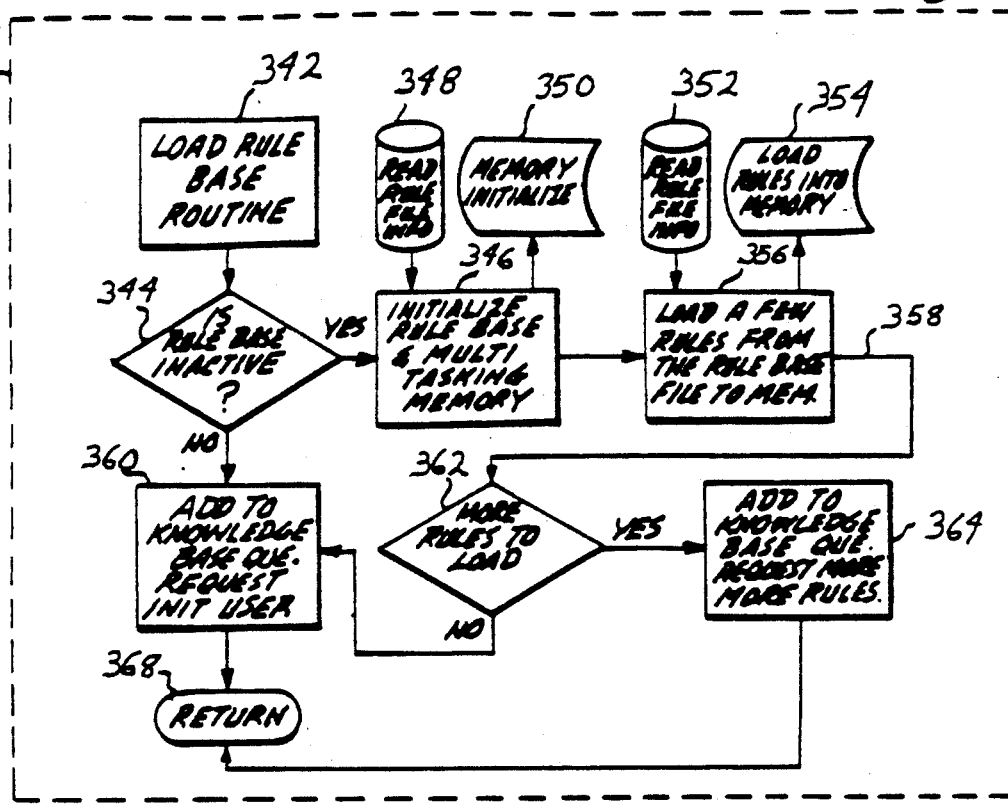
FIG. 7 illustrates how the LOAD RULE BASE routine operates, which is referenced during the INFERENCE ENGINE routine (FIGS. 6a, 6b and 6c)

Referring to FIG. 7, a more detailed look at the LOAD RULE BASE routine is now presented. Upon entering the LOAD RULE BASE routine, it checks to see if the rule base has been loaded at block 344. If it has, it places a request to Initialize User on the Rule Base Que 346 and then returns control to the calling function.

If the rule base has not been loaded, the function initializes the rule base and multi-tasking memory at block 346 and, at block 350, any necessary information is read in from disk 348. Then, at blocks 356 and 352, rule base information from disk is loaded into memory 354.

Because this is a multi-tasking environment, the LOAD RULE BASE routine (FIG. 7) cannot load all the rules from disk into memory at one time, as it would take up too much contiguous CPU time. Instead, it loads a few rules 356 at a time.

It then checks to see if more rules need to be loaded at block 362 and, if so, places a request on the rule base que at block 364 to call itself again so more rules can be loaded after other routines get a chance to be serviced.

When all rules are loaded, it will place a request on the Rule Base Que (14, FIG. 3) to Initialize the User at block 360, and processing returns to the calling routine at block 368.

The multi-tasking service routine (90, FIG. 5b) continues to service routines until the INITIALIZE USER routine request is pulled from the Rule Base Que and processed by the RULE BASE QUE routine (34, FIG. 5c). This routine causes the INITIALIZE USER routine (FIG. 8) to be called in the same manner as the LOAD RULE BASE routine (FIG. 7) was called earlier.

Figure 8:
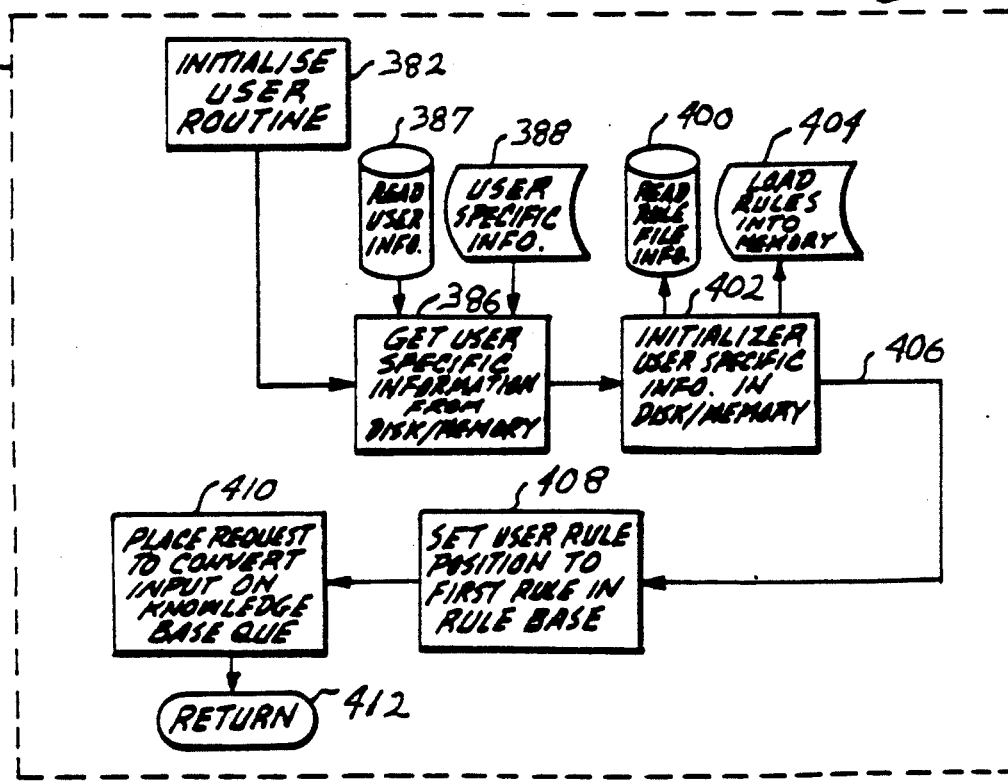
FIG. 8 illustrates the INITIALIZE USER routine, which is referenced during the INFERENCE ENGINE routine (FIG. 6a)

FIG. 8 shows the INITIALIZE USER routine, which was referenced during the LOAD RULE BASE routine (FIG. 7), in more detail. First, all of the necessary user specific information at blocks 386, 387, and 388 is obtained and then loaded into memory at blocks 402, 404, and 400. Then the user rule position is set in the rule base to the first rule to be called at block 408, and then places a request to Fire the Active Rule Base on the rule base que at block 410 before returning control to its calling routine at block 412.

Figure 9:
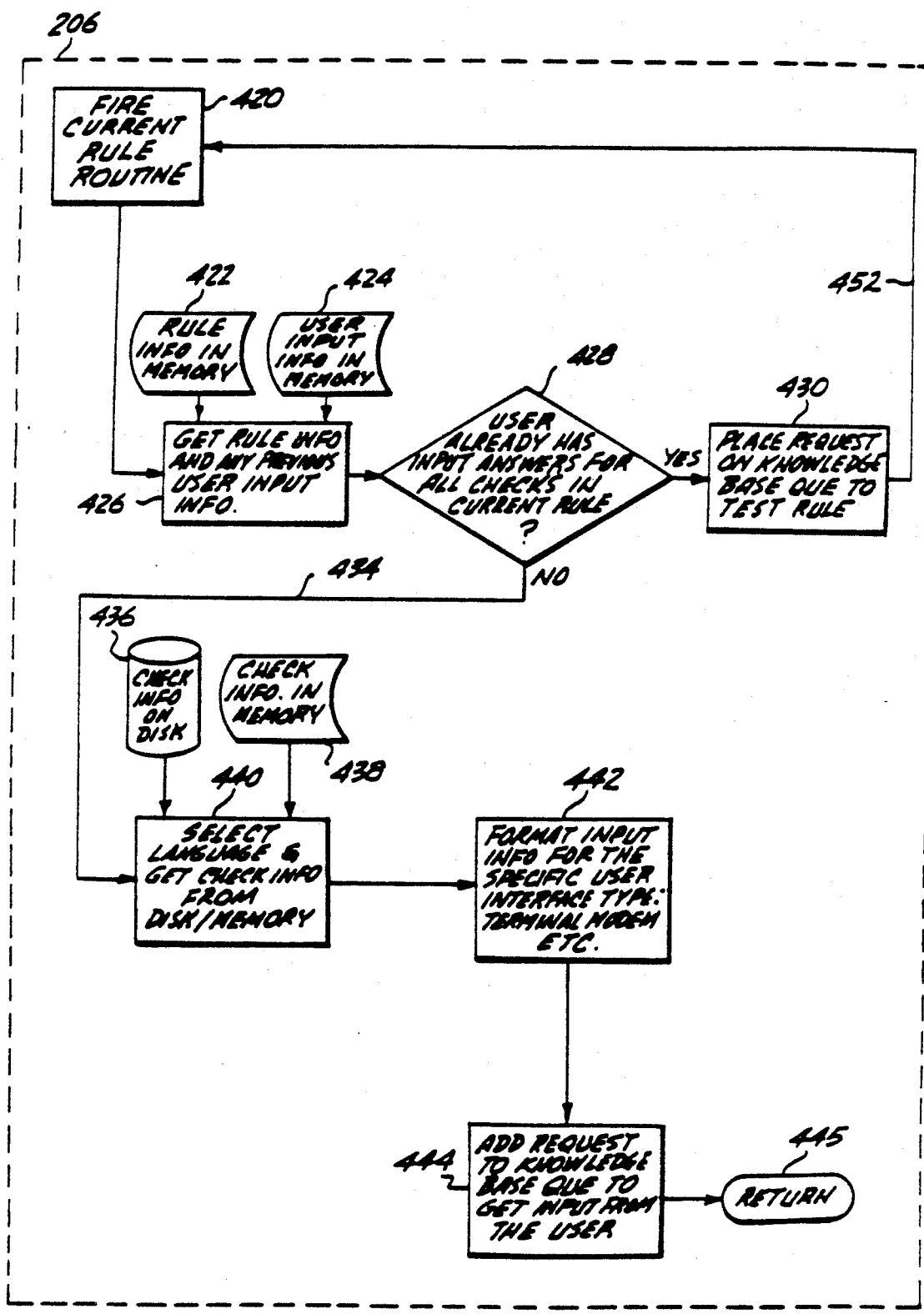
FIG. 9 illustrates the FIRE CURRENT RULE routine, which is referenced during the INFERENCE ENGINE routine (FIG. 6a)

Once again, other multi-tasking routines are processed, as previously described, until the above request is processed and the FIRE CURRENT RULE routine (FIG. 9) is called.

Figure 10:
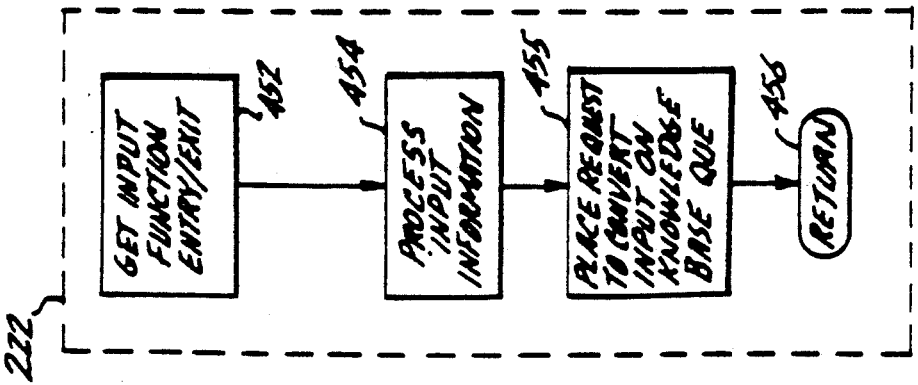
FIG. 10 illustrates the INPUT FUNCTION routine, which is referenced during the INFERENCE ENGINE routine (FIG. 6b)

Referring to FIG. 10, the FIRE CURRENT RULE routine first gets the rule info for the current rule at blocks 426 and extracts the question information to be asked of the user, and then checks to see if the user has already answered the rule question to be asked, by checking the user input info in memory 424.

If the user has input an answer already, then at block 428, a request is placed on the knowledge base que 430 to test the rule, and the function returns so other routines can be processed.

If the user has not input an answer to the question previously, then the routine selects the proper language interface (English, Spanish, etc.) at blocks 440, 436, and 438 and formats the input info for the specific user interface (terminal, modem, etc.) at block 442, and then places a request on the application que (15, FIG. 3) to get input from the user at block 444. Processing returns at block 445 to the calling routine.

When the application program processes the request for input from the user, the user is prompted for an input, and, when entered, it is passed to the rule base via the rule base que (14, FIG. 3) as a request to call the GET INPUT routine (FIG. 10).

Figure 11:
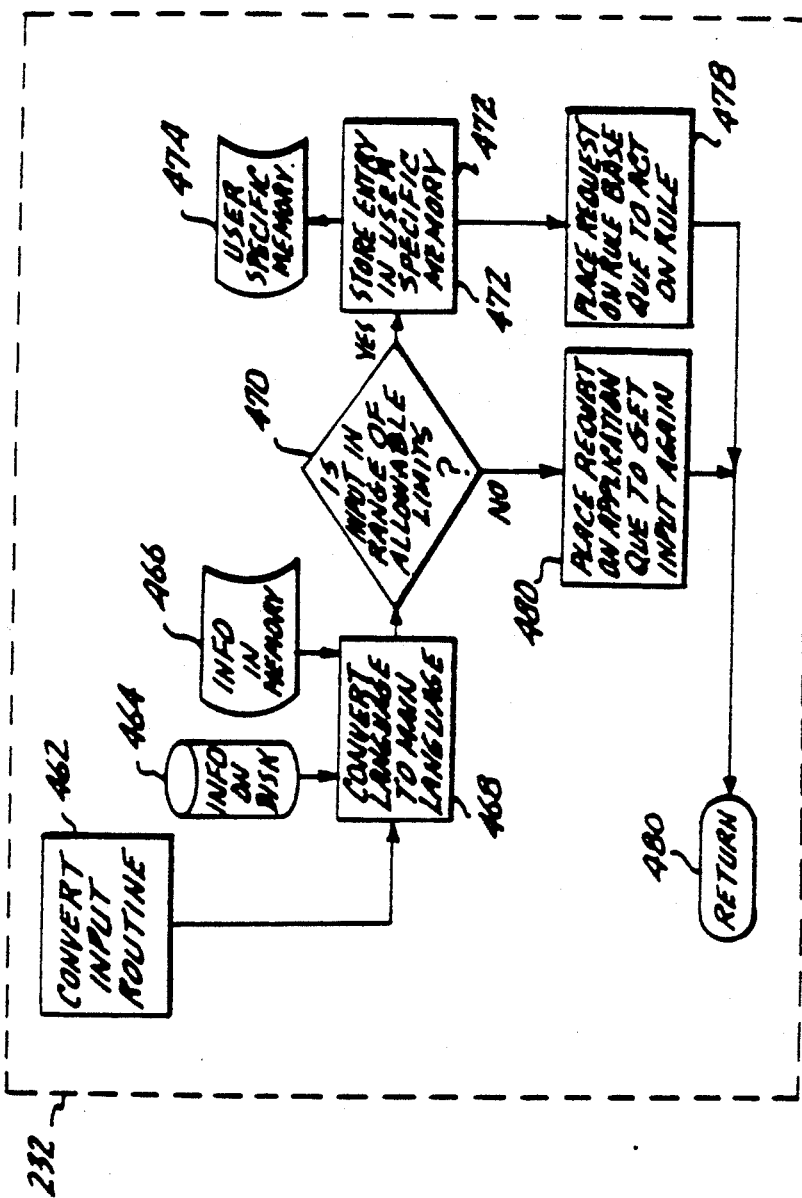
FIG. 11 illustrates the CONVERT INPUT routine, which is referenced during the INFERENCE ENGINE routine (FIG. 6b)

This routine retrieves the information input by the user, processes it at block 454, and then places a request on the rule base que to call the CONVERT INPUT routine (FIG. 11) at block 455, and returns control to the calling routine at block 456 so that other routines can be processed.

When the CONVERT INPUT routine (FIG. 11) is finally called, it converts the user language entry (Spanish, English, etc.) into the base language at blocks 464, 466, and 468 and then checks to see if the answer is within the allowable limits for the question being answered 470. The allowable limits are the constraints placed on the question or answer. For example, in the case of an answer, if the answer must be in a certain format (i.e. true/false, multiple choice) and the answer does not meet the format specification, then an error will be returned at block 480.

If it is not, a request is placed on the application que (15, FIG. 3) to get the input from the user again 480, and processing returns at block 482 to the calling routine.

If the answer is within range, the entry is stored in the user specific input memory 474 at block 472, and a request to test the rule is placed on the knowledge base que at block 478, and then control is returned to the calling routine at block 476.

The TEST RULE routine (FIG. 12) gets the user input for this rule question and checks to see if the entry matches the allowable range for the rule at block 498 and, if not, marks the rule as failed at block 502, and then places a request on the knowledge base to act or the rule at block 504.

Returning to block 498, if the use;; entry matched the entry expected for this rule question, the routine checks to see if there are any more questions that need to be asked of this rule at block 510. If there are no more questions, then the rule is marked passed for the user at block 518, and a request to act on the rule is placed on the knowledge base que at block 516. Processing returns to the calling program at block 520.

If there are more questions to be asked, then the rule pointer is advanced for this user to the next question at block 512, and a request to fire the rule again is placed on the knowledge base que at block 514. Processing returns to the calling program at block 508.

It should be noted that the above strategy is used in order to perform a "depth first search", where all questions in the active rule are asked before going to the next rule. In an alternate embodiment, the strategy could have been a "breadth first search", where a question in every rule is asked first before proceeding to the next rule. The same applies if we were using backward or forward chaining techniques.

Figure 13:
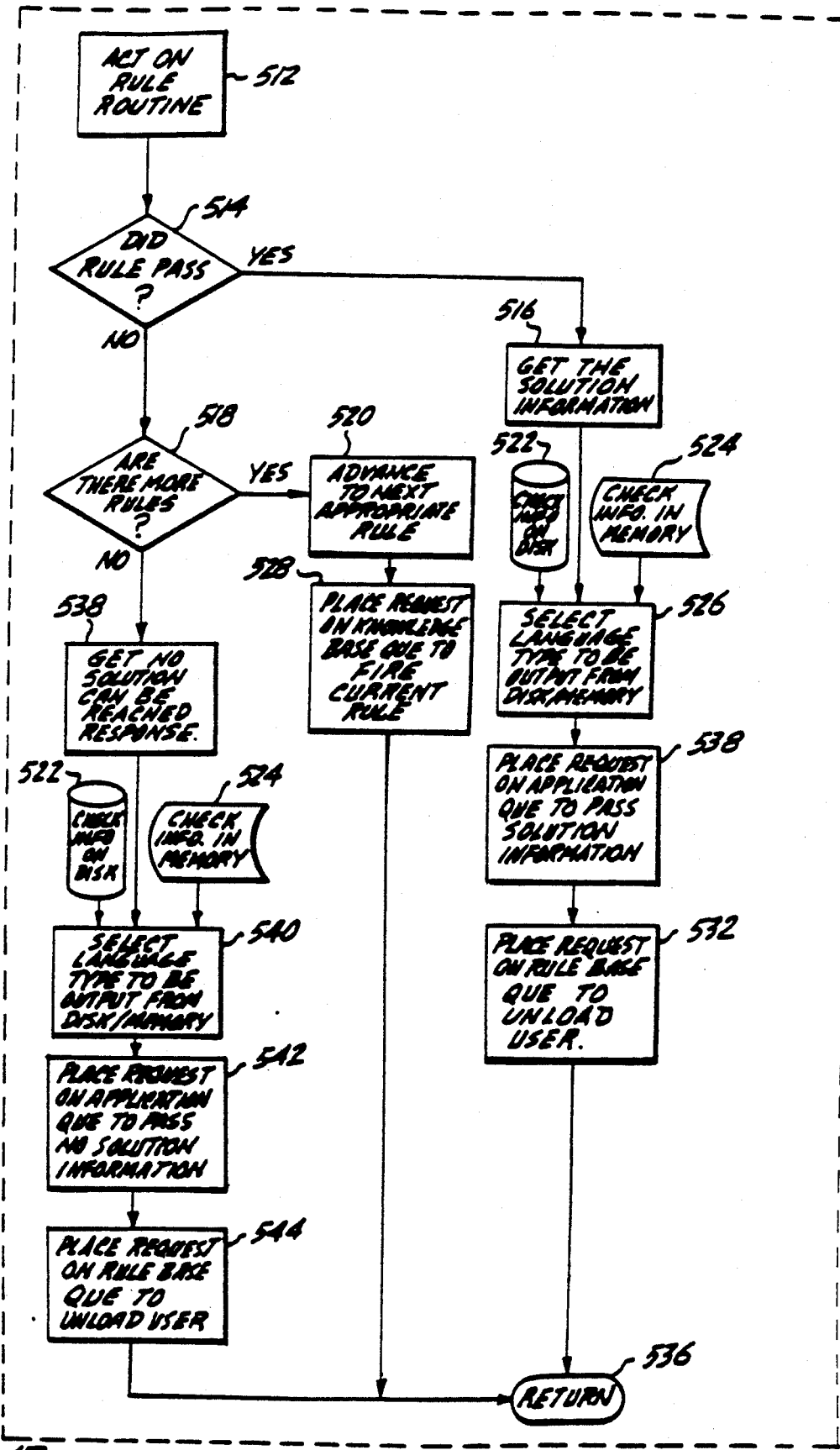
FIG. 13 illustrates the ACT ON RULE routine, which is referenced during the INFERENCE ENGINE routine (FIG. 6b)

The ACT ON RULE routine is detailed in FIG. 13, 252. The first thing it does is check to see if the rule passed or failed at block 514. If the rule passed, it gets the appropriate solution information at block 516 and does the necessary language conversion at blocks 522, 524, and 526 and then places a request on the application que to pass the solution information to the user 530, and also places a request on the rule base que to unload the user at block 532. At block 536, processing returns control to the calling routine so other processes can be serviced.

If the rule failed 514 then, at block 518, a determination is made to check if there are more rules 518 and, if so, the user rule pointer is advanced to the next rule at block 520, and then places a request on the rule base que to fire the current rule at block 528. At block 530, processing returns to the calling routine so other processes can be serviced.

If there had been no more rules left, then the routine would have loaded the information to inform the user that no solution could be reached during block 538. Then the appropriate language would have been selected at blocks 522, 524, and 540, followed by placing a request on the application que to inform the user of no solution at block 542, and then a request would be placed on the rule base que to unload the user at block 544. Processing returns to the calling routine during block 536.

Figure 14:
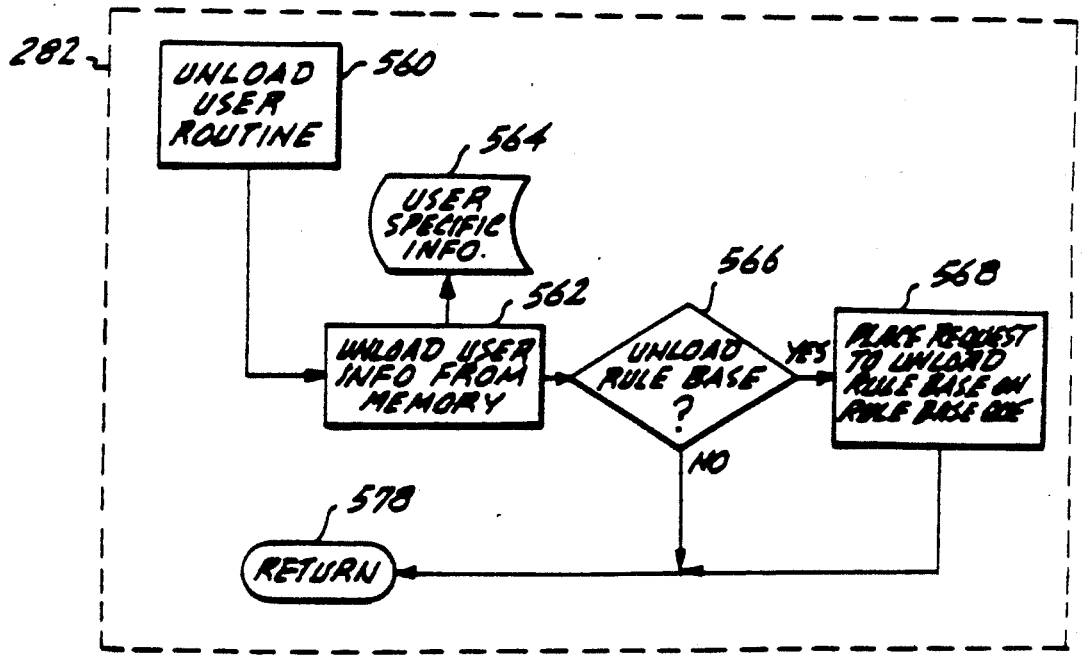
FIG. 14 illustrates the UNLOAD USER routine, which is referenced during the INFERENCE ENGINE routine (FIG. 6c)

Returning to FIG. 14, when the UNLOAD USER routine is called, it unloads the user from the rule base at blocks 564 and 562, and then checks to see if any other users are using the knowledge base at blocks 566. If there are, then processing returns without placing a request on the rule base que to unload the rule base, and it returns to the calling routine 570.

If it determines that the rule base must be unloaded, it places the appropriate request on the knowledge base que at block 568, and then returns processing to the calling routine at block 570.

When the UNLOAD RULE BASE routine (FIG. 16) is called, it checks to see if the main program wants the rule base to unload during block 584 and, if so, unloads the rule base at blocks 588 and 586 and then returns without placing any requests on the que. By placing no requests on the que, this routine essentially stops the chain of events for this user until the user places a new request on the rule base que to start the whole process all over again.

The rule base for this example is a disk file that has been converted from an ASCII version, as shown in FIG. 16, to a formatted compiled version at memory 322. The Expert system COMPILE RULE BASE routine (FIG. 16) can be called by the application program (18, FIG. 3) through the previously-explained queuing system and, when called, will read a specified ASCII rule base 318 and compile it or convert it to a formatted rule base 322 for use by the expert system. This formatting allows the knowledge base to set up information it needs in the order it would like when rule loading takes place. Processing returns to the calling routine at block 321.

One reason this compilation process has been added is to allow for future data/knowledge retrieval and conversion from other data sources (such as other foreign rule bases or data bases).

FIG. 17 shows an exemplary sample extract of an ASCII rule base before it has been compiled. FIG. 18 shows the same sample after compilation.

Since the expert system is designed to handle 17 more than one user, the memory techniques for loading the rule base have been designed to share common information when possible and have also been designed to segregate data for each user that is unique.

FIG. 19 shows a sample rule from the rule base in FIG. 17 which will be used in explaining the memory loading scheme used by the expert system.

FIGS. 17, 18, and 19 show the different memory schemes for storing the rule base information and their associated parts.

The following description of a rule base is a customer support system that supports customers and customer support personnel through the use of the rule base (FIG. 1a) and inference engine 16 (FIG. 3) as described earlier in reference to FIG. 3.

Its user interfaces include a main system keyboard screen, eight user terminals, and support up to 32 users via telephone. The system can answer up to 32 lines simultaneously (as well as the terminals and main keyboard) and deliver on-line diagnostic assistance to the terminals and to the phones in the form of digitized voice where users interact with the rule base by pushing the touch tones on their phone.

As explained in the preferred embodiment, all users are accessing the same rule base and inference engine (FIG. 3) in a multi-tasking environment through the use of the que management routines.

Each rule in the rule base (FIG. 19), 1001 consists of several parts. There is a product type 1001A that is used to differentiate the rule by different products or types. As an example, if the rule base had three different types of diagnostic sessions in it, the product area would be used to segregate the different knowledge bases for each other without having to maintain unique and separate rule bases in memory and on disk.

In the above instance, an initial product assignment rule (FIG. 19), rule 1000 or 1007 would assign a type to the product area, and from then on, only those rules that matched the product type would be fired and tested.

The prod( ) part of the rule (FIG. 19), 1001a could also contain more than one product variable. A rule could contain several product or type entries, which would make the rule available to a variety of rule bases within the same file.

Some exemplary samples of the product field under multiple selection might look like this:

prod(CABLE and ELECTRICAL)—This rule would only be fired and tested if both CABLE and ELECTRICAL were active in the diagnostic session.

prod(CABLE or COMPUTER)—This rule would be called if either CABLE or COMPUTER were active in the diagnostic session.

prod((CABLE and ELECTRICAL) or COMPUTER)—This last example shows a rule that would be fired and tested under two circumstances, the first being if both CABLE and ELECTRICAL were active and the other if COMPUTER was active.

The above examples show the flexibility the knowledge base inference engine can offer, depending on the product field assignments.

The next part of the rule (FIG. 19) is the check( ) statements. A rule may have as many check( ), statements as it wants. These check statements are the instructional statements that the inference engine uses to ask the user questions, and, upon receiving answers, it uses the check statement information to parse and test the user's answer against the acceptable answer.

Let's assume that the product assignment for this rule session was assigned as "HARD DISK BOARD" 1004. In this case, first rule to be fired after product assignment will be rule 1005. The first check statement within this rule 1006 will cause the inference engine to read a file from disk that has the ID code of "FAILURE TIME". The record read from the disk will contain the more detailed question that must be asked of the user, as well as the type of input (YES or NO, INTEGER, MULTIPLE CHOICE, etc.) and the acceptable ranges of the input. It can also include additional information, such as a help menu and a menu that could be used in building an answer if the user asked why the inference engine is asking a specific line of questions. If the user requested a session in a foreign language, then a different record with the foreign language requested would be loaded instead.

The answer to the question for this check will be tested against the acceptable value, in this case, an integer value of 3. Other values that the system can test for would be TRUE or FALSE or a range of integers or floating point number, as well as multiple choice answers.

The cause statement 1020 contains the ID for the record that is loaded, if the rule passes. The record loaded would contain information regarding a solution to the problem, as well as specific information needed to complete the session based on the current solution. For example, the solution might generate a specific E-MAIL letter to a person or group of persons.

In order to maintain a multi-user capability, the rule base must be loaded into memory in a way that substantially differs from prior art designs. Because of the multi-user requirements, memory design had to minimize memory consumption and, at the same time, segregate users without requiring multiple memory copies of the rule base.

Figure 20:
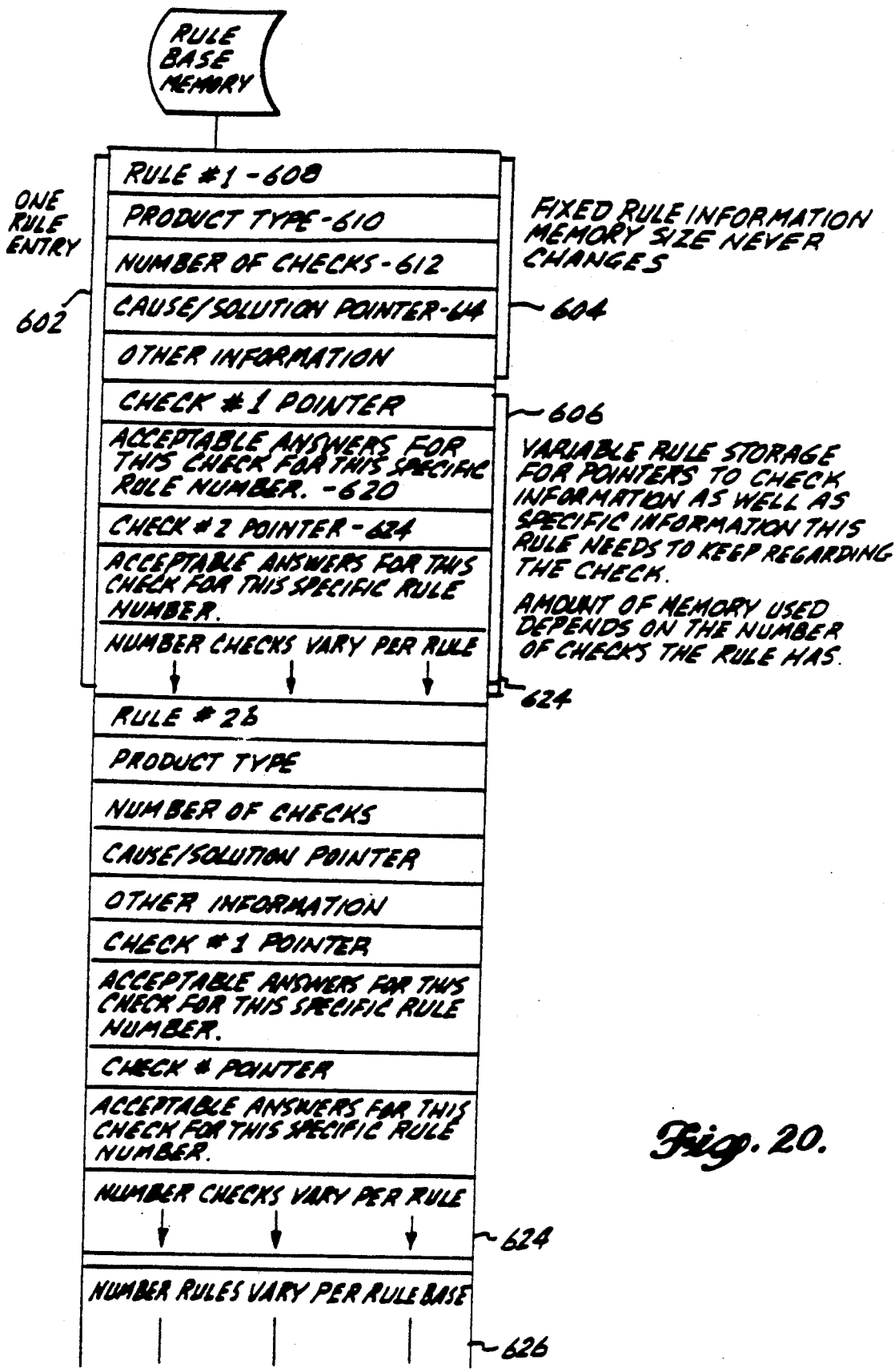
FIG. 20 illustrates the memory management allocation scheme used by the expert system for loading and servicing the rule base, and it is designed to accommodate multiple users.
Figure 21:
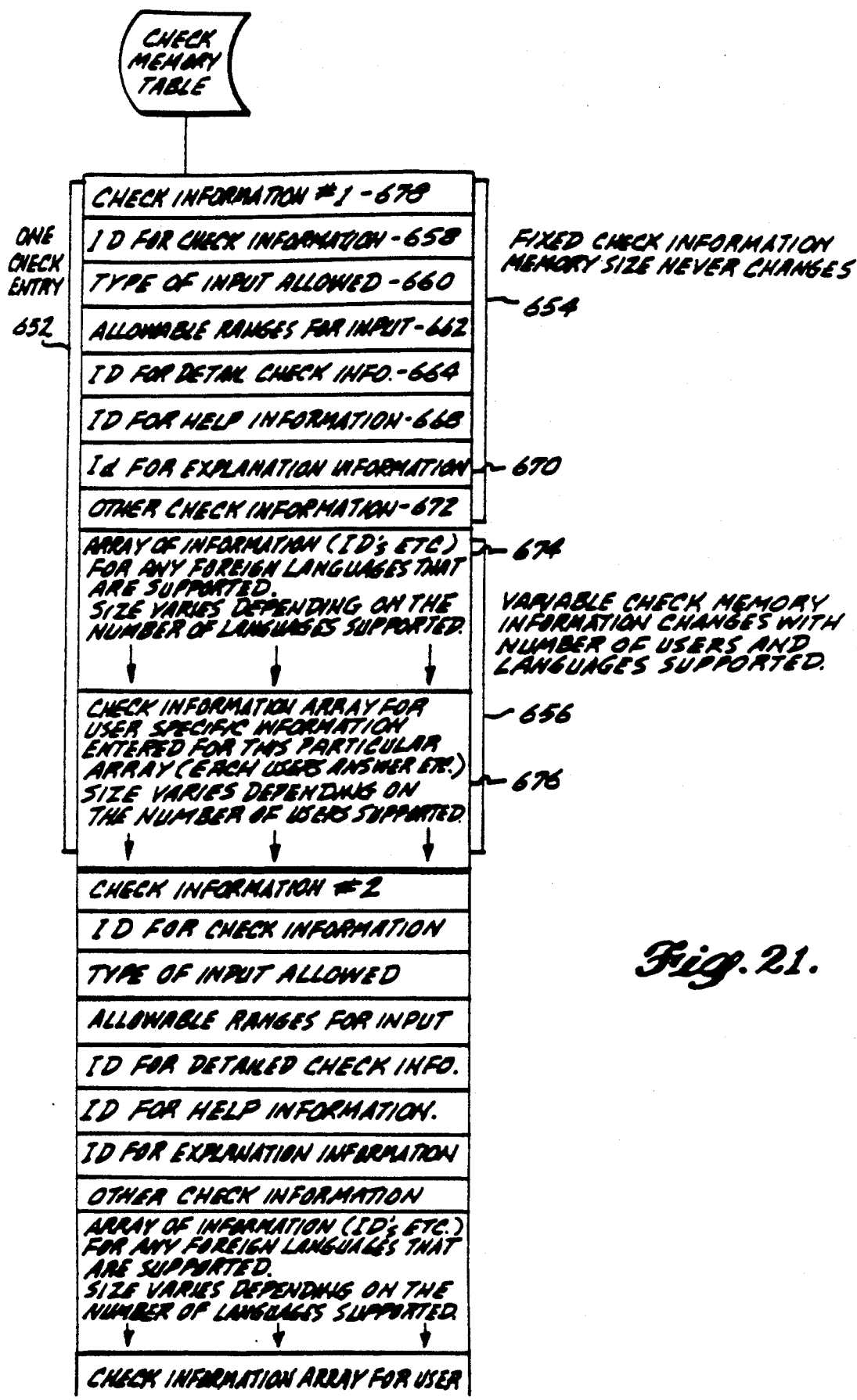
FIG. 21 illustrates the memory management allocation scheme used by the expert system for loading and servicing the check information (rule questions), and it is designed to accommodate multiple users.
Figure 22:
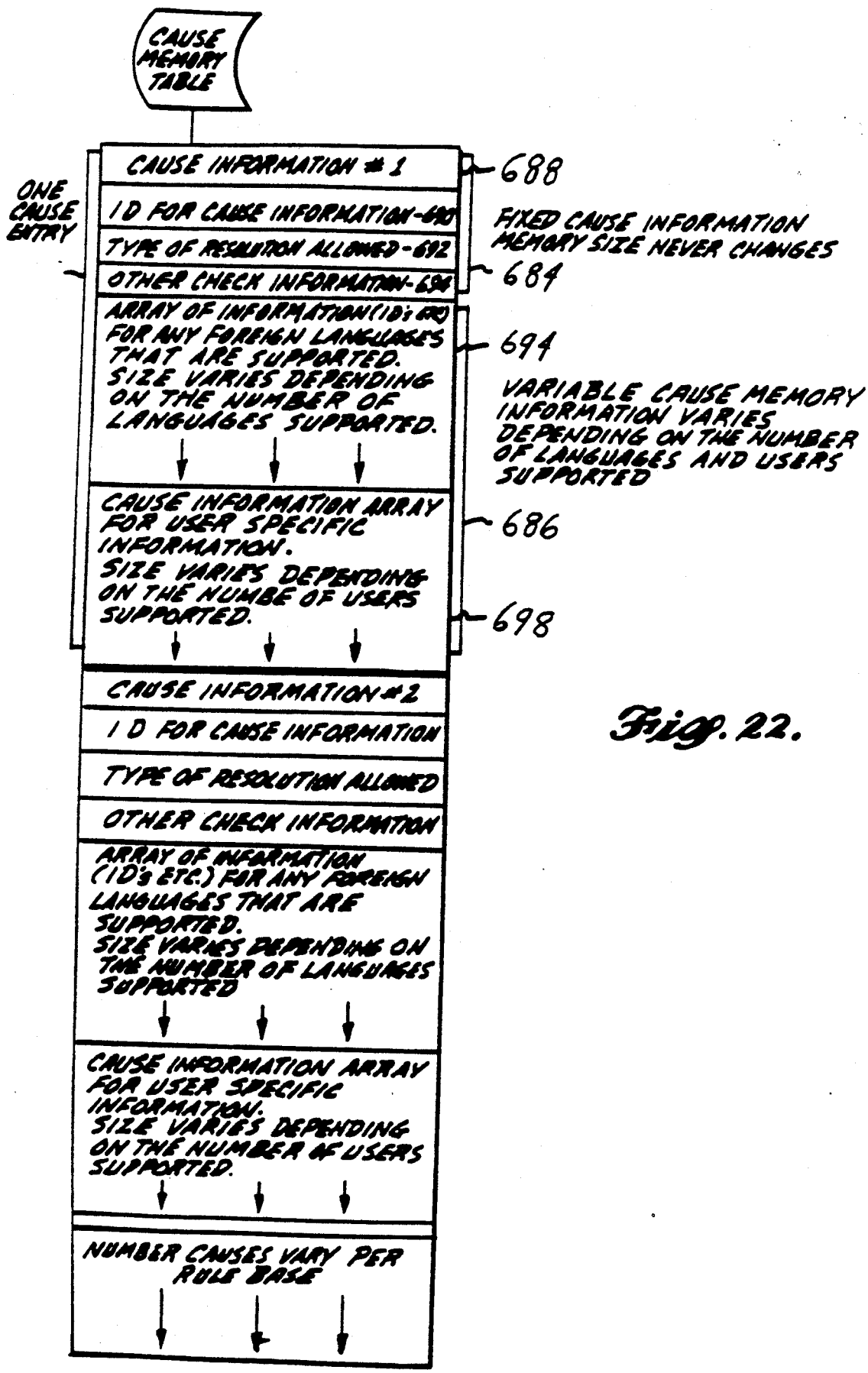
FIG. 22 illustrates the memory management allocation scheme used by the expert system for loading and servicing the cause information (cause/solutions), and it is designed to accommodate multiple users.

A detailed set of diagrams showing how this memory scheme is accomplished is 20 shown in FIGS. 20, 21, and 22.

When a rule base is loaded into memory, the basic rule information loads up, as shown in FIG. 20. Rule #1 in this example 602 is loaded first. Each rule in memory has a fixed-length memory area 604 and variable memory length area 606.

The fixed area 604 is used to store information that every rule must contain, like product type 610 and the Cause/Solution memory pointer 614, which points to the cause memory, FIG. 22.

The variable memory storage for each rule 606 is used to store the check question memory pointers 618 and 624 for each check question in the rule. Since the number of checks 612 vary with each rule, this memory area varies with each rule also.

The check information stored in this variable area includes a pointer 618 to the check location in the check memory, FIG. 21, as well as the acceptable answer(s) needed for this particular rule for this check question, FIG. 17, 620.

This rule base memory area itself is also variable 626, depending on the number of rules in the rule base.

Check and cause memory pointers are used 618, 624, and 614 in the Rule Base Memory in order to reduce the amount of memory needed to hold the rule base. This is done because the check and cause information can be used many times throughout the rule base. It is possible that a single check could be part of every rule in the rule base. Duplicating the memory needed to store all the check information for each needed instance would not be efficient, so they are only stored once in the check or cause memory and referenced by pointers.

All the memory tables discussed here are loaded into memory that is dynamically allocated by dynamic memory allocation routines which allow the rule base to be as large as memory allows. Dynamic memory allocation also allows the system to handle different-size rule bases without having to modify the expert system.

FIG. 21 shows the memory layout of the check memory table. As with the rule memory table, each check 652 is comprised of a fixed memory area 654 and a variable memory area 656.

The fixed-memory area stores the !D code for retrieving the appropriate check question from a data base file pointed at 658. It also stores information like the type of input at 660 and allowable ranges of the input at 662.

It also stores ID for more detailed information that the expert system can call upon, if desired. The ID for detailed check info 664 can retrieve more detailed question information that is used when the short question ID 658 does not have adequate room to ask the information desired.

There is also an ID area for help information 668 that the user can call upon if he/she needs help, as well as an explanation ID 670 that the user can call on if he/she wants to know why the expert system is asking this question.

The check memory table array is were the unique answers for each user are stored 676. This area is used to segregate the user answers without having to duplicate a check memory table for every user.

There is also an area that stores the information needed to support multiple languages at 674, and its size varies, depending on the number of languages supported.

Like the rule table memory area, the check table memory area is variable, depending on the number of checks in the rule base.

FIG. 22 shows the cause memory table, and the cause also has the two-part memory area, a fixed 684 and a variable 686 area, and the multiple language support area 696.

The type of resolution field 692 allows for the storage of different types of resolutions a cause might have. For example, if the cause was a bad cable box, the type of resolution might be to cause the computer to generate a service order for the customer.

As with the rule and check memory tables, the cause memory table is also variable, depending on the number of causes in the rule base.

If the entire rule base exceeds the memory of the system, additional provisions can be made to cache this information to disk which would simulate system memory.

This entire system design could be loaded into the memory of a computer, or could be designed to be incorporated into add-in pc board(s) that could simply plug into a computer system.

In order to better understand the functionality of the knowledge base system and how it interacts with the rule base on a multi-user basis and memory, a detailed review of the process the inference engine goes through when accessing the firing rule in the rule base is now presented.

Using the rule base in FIG. 19 as an example, the first rule to be fired by the system would be rule 1000 which would, in turn, ask the user in this case what type of demonstration they would like to access.

Let's assume the user responded with a value of 2 for the check statement check (*TYPE OF DEMO) 1002. The inference engine would store the user's answers in a private memory location (FIG. 21) and then compare the answer with the value of 1, which it needs for rule 1000 to pass.

Since the values do not match, the rule fails, and then the inference engine now steps to the next rule 1007. The inference engine looks at the first check statement in rule 1003 and checks to see if it has already been answered by the user. In this case, it has, so check 1003 it is not asked again. Instead, it compares the user input value of 2 which was stored in a private memory location (70, FIG. 21) to the acceptable value of check 1003 and finds that they match, so this rule passes without the user ever being asked a second question.

Since rule 1007 is a product-assigning rule, it assigns the product value of HARD DISK BOARD by reading statement 1004.

Now that the system has a product assignment of HARD DISK BOARD, it bypasses all rules with a CABLE product assignment and fires the next rule 1005. It will then ask the question associated with the next check, and the process continues until a solution is reached or not reached.

Check statement values can also be system-assigned by changing the syntax of the check statement. The following statement is a check statement that tells the inference engine to assume the value of the check statement to be I and do not ask the user to assign the value.

assume(check(POWER ON)==TRUE);

FIGS. 23a and 23b are charts that simulate the entry of the rule base by two users to show the functionality of a multi-user, multi-tasking environment incorporating the present invention. After reviewing the chart, it is easy to see how it can accommodate multiple users.

The chart is designed to show the functions and processes called by the RULE BASE and APPLICATION QUE PROCESS functions, FIG. 5b, 92 & 94, as they are called within the application input character loop of FIG. 5b.

Each line entry in the chart represents a routine (column 4) called in the inference engine. Remember, these routines are short routines designed to return control to the entire system so multi-users can all be serviced properly.

The request to call the routines is passed through the rule base or application ques and column 1 shows which que the information is retrieved from.

Column 2 depicts which user is being serviced during this routine. Column 3 gives a brief description of what will happen during the time the user is serviced.

Once the routine that is requested is called, it may itself place a new request on one of the ques to complete some new action when it is retrieved and processed. If this occurs, the routine or routines will be listed in column 5, and the que request(s) are placed on the que and they are listed in column 6.

Column 7 references a diagram that depicts the routine that is being executed in column 4.

Referring to FIG. 23a, in row 1, the first user requests a diagnostic session which causes an information packet to be placed on the Rule Base Que which when processed will cause the LOAD RULE BASE routine (FIG. 7) (column 4) to be called.

Since the initial loading of a rule base can take many seconds, the routine cannot load the entire rule base at one time because it would not allow other user requests to be serviced.

To get around this, the routine loads a few rules and then before returning, it places a new request (column 5) to call itself again so it can continue to load more rules.

Referring to row 2 of FIG. 23a, since there are no other user requests on the que, the request placed on the que in ROW 1 is processed, which causes the load rule base to be called again. As in ROW 1, the routine loads a few rules and then places a new request to call itself again (column 50) on the que and then returns.

The first request from another user (user 2) who is requesting a diagnostic session is shown in row 3. The LOAD RULE BASE routine (FIG. 7) is called (column 4), but no attempt to load the rule base is made because user 1 has already initiated this. Instead, the routine places a request on the que to call the INITIALIZE USER routine (FIG. 8) (column 5) and then returns.

In row 4, the next request is for user 1 and it is to call the LOAD RULE BASE routine (FIG. 7) which completes the loading of the rule base. It then places a request to call the INITIALIZE USER routine (FIG. 8) (column 5) for user 1 and then returns.

The next request is for user 2 to be initialized. The INITIALIZE USER routine (FIG. 8) (column 4) is called for user 2 and then a request to call the FIRE CURRENT RULE routine (FIG. 9) (column 5) is placed on the que and the routine returns.

In row 6, the same request comes to initialize user 1, and it also is processed and then a request to call the FIRE CURRENT RULE routine (FIG. 9) is placed on the que for user 1.

Next the rule is fired for user 2. This causes a request to be placed on the application que to get an answer from user 2. Along with the request, the rule base passes the necessary information the application program needs to ask the user the information he/she needs to answer the question at hand for this part of the rule.

In row 8, the same request is processed for user 1. Rows 9 and 10 show the application que processing the information passed to it and then the application program will ask the users the questions and return.

Row 11 processes the input from user 2 that was passed to the rule base by the application program. The GET INPUT routine processes the information and then places a request to call the CONVERT INPUT routine (FIG. 11) (column 5) and then returns.

Here the CONVERT INPUT routine (FIG. 11) is called for user 2. The routine finds that the user input answer is not within the allowable ranges, so it places a request on the application que to get the answer again (column 5) and then it returns.

Row 13 processes the input from user 1 that was passed to the rule base by the application program. The GET INPUT routine (FIG. 10) processes the information and then places a request to call the CONVERT INPUT routine (column 5) and then returns.

Row 14 shows the application que processing the information for user 2 in order to get a new input to the question previously asked. This is the answer to the question that was previously entered, but was out of range (ROW 12).

In row 15, the data input is processed by user 1 and then places a request on the knowledge base que to call the Test Rule (column 5) and then returns.

Referring to FIG. 23b, in row 16 the answer to the rule question for user 1 is compared to the acceptable answer for the current rule. In this case, the input value matches the value required so the question passes. The routine then checks to see if there are more questions in the current rule to be asked. There are, so it places a request on the rule base que to fire the current rule again so the next question can be asked.

In row 17, the input is processed from user 2 that was passed to the rule base by the application program. The GET INPUT routine processes the information and then places a request to call the CONVERT INPUT routine (FIG. 11) (column 5) and then returns.

Next the rule is fired for user 1, in row 18. This causes a request to be placed on the application que to get an answer from user 1. Along with the request, the rule base passes the necessary information the application program needs to ask the user the information he/she needs to answer the question at hand for this part of the rule.

Figure 12:
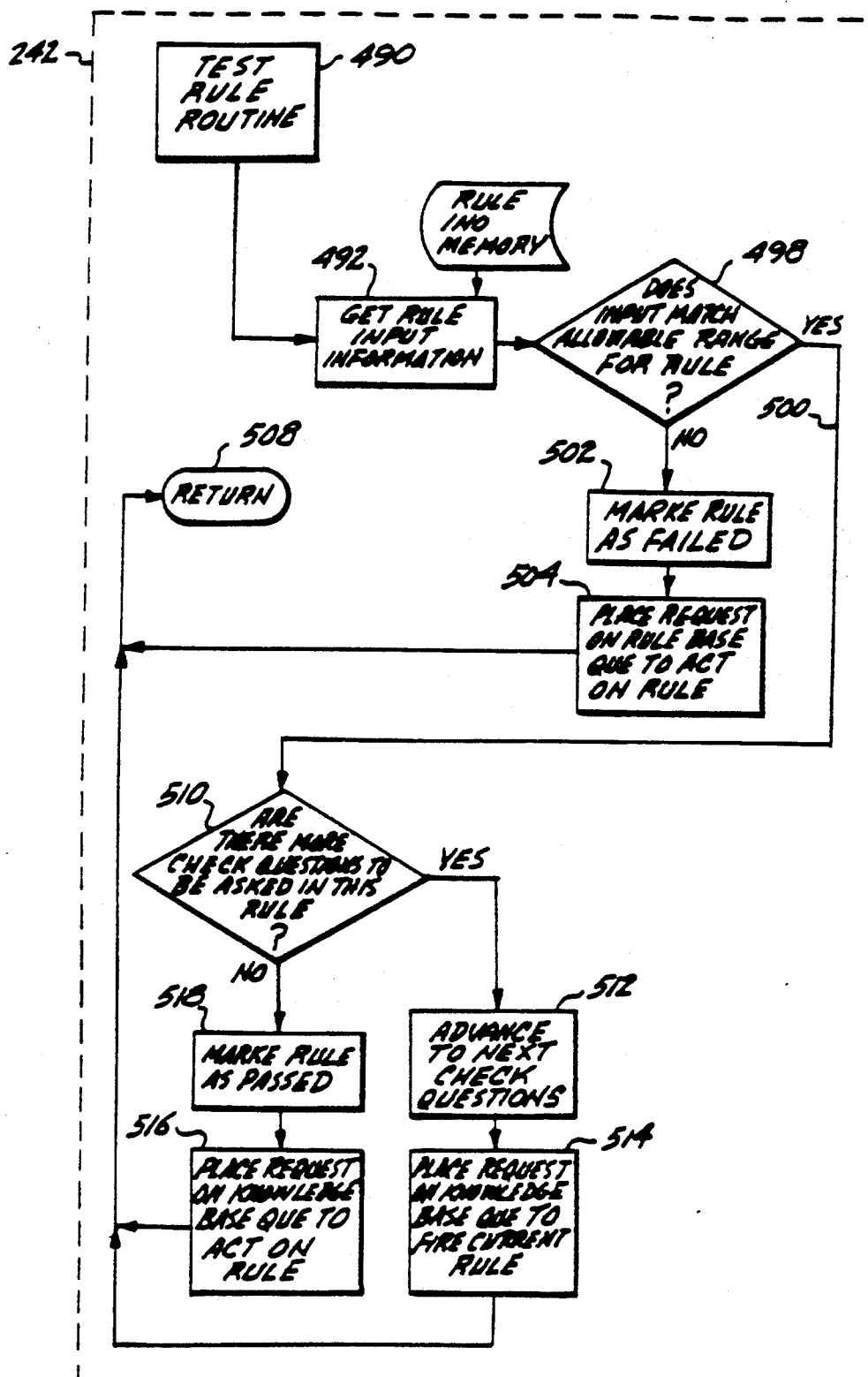
FIG. 12 illustrates the TEST RULE routine, which is referenced during the INFERENCE ENGINE routine (FIG. 6b)

At row 19, the CONVERT INPUT routine (FIG. 11) is called for user 2. The routine finds that the user input this time is within the allowable ranges so it places a request on the rule base que to call the TEST RULE routine (FIG. 12).

At row 20, the application que is shown processing the information passed to it and then application program will ask the users the questions and return.

At row 21, the TEST RULE routine (FIG. 12) and the answer input by user 2 is compared with its acceptable value for the question in the current rule. In this instance, the value is not what the rule needed to continue, so the rule fails and a request is placed on the rule base que to call the ACT ON RULE routine.

Figure 15:
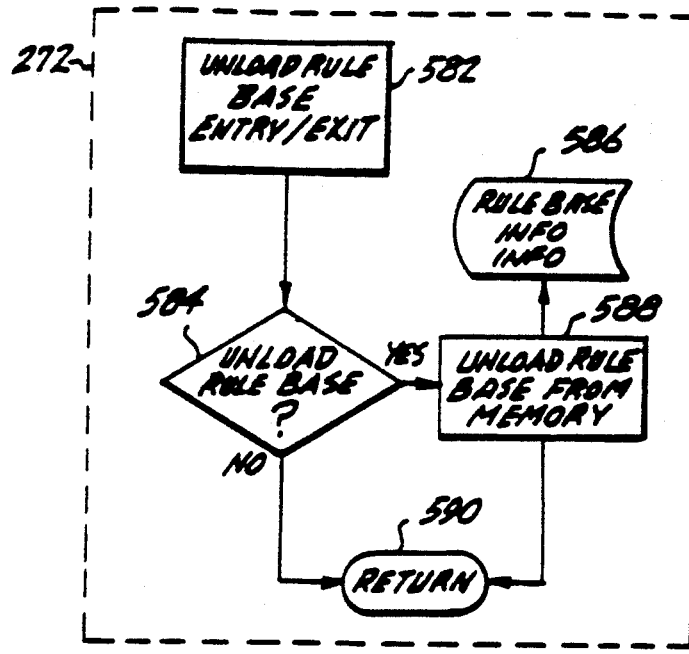
FIG. 15 illustrates the UNLOAD RULE BASE routine, which is referenced during the INFERENCE ENGINE routine (FIG. 6c)

In row 22, the ACT ON RULE routine (FIG. 13) is processed for user 2 and the routine checks to see if there are any more rules to fire. Since in this example there is only one rule in the rule base, there are nc more rules to fire. As a result, the routine places two requests on the ques before returning. The first one is a request to notify the user that no solution can be reached and this is place on the Application Que. The second request is placed on the rule base ques and is a request to call the UNLOAD USER routine (FIG. 15) for user 2.

At row 23, the application program receives the "No Solution" information which is passed to user 2. Since there are no more questions to be asked, the session is completed. As a result, no requests are placed on any ques by the application que and user 2 is finished until a new request for a diagnostic session is started by the user.

At row 24, the input from user 1 that was passed to the rule base by the application program is processed. The GET INPUT routine (FIG. 10) processes the information and then places a request to call the CONVERT INPUT routine (FIG. 11) (column 5) and then returns.

At row 25, the UNLOAD USER routine (FIG. 11) is shown called for user 2. User 2 is unloaded, but a request to call the Unload Rule Base is not placed on the rule base que because user 1 is still in an active session.

At row 26, the CONVERT INPUT routine (FIG. 11) is called for user 1. The routine finds that the user input this time is within the allowable ranges to it places a request on the rule base que to call the TEST RULE routine (FIG. 12).

At row 27, the TEST RULE routine (FIG. 12) and the answer input by user 1 is compared with its acceptable value for the question in the current rule. In this instance, the value is what the rule needed to continue, so the inference engine checks to see if there are any more questions to be asked for this rule. Since there are not, a request is placed on the rule base que to call the ACT ON RULE routine.

In row 28, the ACT ON RULE routine (FIG. 13) is processed for user 1 and since the rule passed, the routine places tow requests on the ques before returning. The first one is a request to notify the user that the rule passes and what the solution is is placed on the Application Que. The second request is placed on the rule base ques and is a request to call the UNLOAD USER routine for user 1.

At row 29, the UNLOAD USER routine (FIG. 14) is called for user 1. User 1 is unloaded and this time a request to call the Unload Rule Base is placed on the rule base que because no other users are active.

In row 30, the Unload Rule Base Function is called and the cycle stops.

From the foregoing, it is seen that this multi-user expert system provides an enhanced capability over current single-user dedicated expert systems. With the provision of the present invention, multiple users may have access to the same knowledge base on the same computer system, even if there exists no multi-tasking capabilities (as the preferred embodiment herein shows). Therefore, it is clearly evident that the delineated objects and features of the inventions will be accomplished.

It is also seen that the invention can be adapted to operate in a variety of modes, from a single-user mode to a mode where the multi-tasking is simulated through polling to a system that delivers information in multiple foreign languages to a variety of different user input formats.

Various modifications, including the porting of the above into a special ad-in pc board design, may suggest themselves to those skilled in the art without departing from the spirit of the invention. For example, the computer servicing the program need not be one that lacks multi-tasking or multi-user capabilities. The invention could easily be integrated into a computer system that supports multiple tasks. In this case, the computer system could dispatch separate tasks through its operating system, thus eliminating the need for a polling mode and allowing the system to be serviced by separate tasks, all of them being serviced by the invention. The invention is thus not to be restricted to the specific forms shown or the uses mentioned, except as to the extent indicated.

I claim:

1. A method, utilizing a computer, for creating an expert system accessible by a plurality of users, said expert system comprising at least one rule base, said at least one rule base comprising knowledge for solving problems, said expert system for providing said rule base knowledge from said at least one rule base to said plurality of users, said method comprising the steps:

coordinating communications between said plurality of users and said expert system, said communications comprising at least one inquiry and at least one response to and from said at least one rule base;

placing each said at least one inquiry of each said at least one response in a packet for temporary storage, said packet including identification information for at least one user of said plurality of users, said identification information including an identifier of said at least one rule base, an identifier of said at least one user, and an identifier of the current rule base state and event;

processing each said at least one inquiry or each said at least one response in said packet entirely before processing a next packet, buffering said at least one response or said at least one inquiry in said packet in a first and a second queue, where said first queue buffers said at least one inquiry or said at least one response from at least one of said plurality of users to said at least one rule base, and said second queue buffers said at least one inquiry or said at least one response from said at least one rule base to said at least one user;

for each of said packets, inferencing said at least one inquiry or said at least one response of said packets stored on said first queue buffer with said knowledge contained in said at least one rule base.

2. The method of claim 1, wherein said step of coordinating communications further comprises the step of enabling said communications to be in a user specified language.

3. The method of claim 2 wherein said step of enabling further comprises the step of enabling said specified user language to be in any user specified spoken language.

4. The method of claim 2 wherein said step of enabling further comprises the step of referencing an alternative language table for interpreting and responding to said user specified language, said alternative language table comprising a first and a second key, said first key indicating said at least one inquiry or said at least one response and said second key for indicating said user specified language, whereby said user specified language is transparent to said at least one rule base.

5. The method of claim 1 wherein said step of buffering further comprises the step of managing said at least one response and said at least one inquiry with said first and said second queues.

6. The method of claim 1 further comprising the step of updating said packet of user information after said step of inferencing, whereby the status of processing said inquiry or said response for each said user of said plurality of users is maintained.

7. The method of claim 1 wherein said step of inferencing further comprises the step of interpreting said at least one inquiry or said at least one response for determining an appropriate action to be taken in said rule base.

8. The method of claim 7 wherein said step further comprises the step of providing said at least one response or said at least one inquiry from said rule base to said packet.

9. An apparatus utilizing a computer, for creating an expert system accessible by a plurality of users, said expert system comprising at least one rule base, said at least one rule base comprising knowledge for solving problems, said expert system for providing said rule base knowledge from said at least one rule base to said plurality of users, said method comprising:

means for coordinating communications between said plurality of users and said expert system, said communications comprising at least one inquiry and at least one response to and from said at least one rule base;

means for placing each said at least one inquiry of each said at least one response in a packet for temporary storage, said packet including identification information for at least one user of said plurality of users, said identification information including an identifier of said at least one rule base, an identifier of said at least one user, and an identifier of the current rule base state and event;

means for processing each said at least one inquiry or each said at least one response in said packet entirely before processing a next packet, means for buffering said at least one response or said at least one inquiry in said packet in a first and a second queue, where said first queue buffers said at least one inquiry or said at least one response from at least one of said plurality of users to said at least one rule base, and said second queue buffers said at least one inquiry or said at least one response from said at least one rule base to said at least one user;

for each of said packets, means for inferencing said at least one inquiry or said at least one response of said packets stored on said first queue buffer with said knowledge contained in said at least one rule base.

10. The apparatus of claim 1, wherein said means for coordinating communications further comprises means for enabling said communications to be in a user specified language.

11. The apparatus of claim 10 wherein said means for enabling comprises means for enabling said specified user language to be in any user specified spoken language.

12. The apparatus of claim 11 further comprising means for referencing an alternative language table for interpreting and responding to said user specified language, said alternative language table comprising a first and a second key, said first key indicating said at least one inquiry or said at least one response and said second key for indicating said user specified language, whereby said user specified language is transparent to said at least one rule base.

13. The apparatus of claim 9 wherein said means for buffering further comprises means for managing said at least one response and said at least one inquiry with said first and said second queues.

14. The apparatus of claim 9 further comprising means for updating said packet of user information after said step of inferencing, whereby the status of processing said inquiry or said response for each said user of said plurality of users is maintained.

15. The apparatus of claim 9 wherein said means for inferencing further comprises means for interpreting said at least one inquiry or said at least one response for determining an appropriate action to be taken in said rule base.

16. The apparatus of claim 15 further comprising means for providing said at least one response or said at least one inquiry from said rule base to said packet.

* * * * *